US010581687B2

(12) United States Patent
Singh et al.

(10) Patent No.: US 10,581,687 B2
(45) Date of Patent: Mar. 3, 2020

(54) REAL-TIME CLOUD-INFRASTRUCTURE POLICY IMPLEMENTATION AND MANAGEMENT

(71) Applicant: AppFormix Inc., San Jose, CA (US)

(72) Inventors: Sumeet Singh, Saratoga, CA (US); Travis Newhouse, Encinitas, CA (US); Harshit Chitalia, Santa Clara, CA (US); Parantap Roy, Mountain View, CA (US); Tarun Banka, Milpitas, CA (US); Moitrayee Gupta, San Jose, CA (US); Pawan Prakash, San Francisco, CA (US)

(73) Assignee: AppFormix Inc., San Jose, CA (US)

( * ) Notice: Subject to any disclaimer, the term of this patent is extended or adjusted under 35 U.S.C. 154(b) by 424 days.

(21) Appl. No.: 15/084,927

(22) Filed: Mar. 30, 2016

(65) Prior Publication Data

US 2016/0277249 A1 Sep. 22, 2016

Related U.S. Application Data

(63) Continuation-in-part of application No. 14/811,957, filed on Jul. 29, 2015, now Pat. No. 10,291,472, and
(Continued)

(51) Int. Cl.
*H04L 12/24* (2006.01)
*H04L 29/08* (2006.01)
(Continued)

(52) U.S. Cl.
CPC ...... *H04L 41/0893* (2013.01); *G06F 9/45533* (2013.01); *G06F 9/45558* (2013.01);
(Continued)

(58) Field of Classification Search
CPC ......... H04L 67/10; H04L 67/16; H04L 67/22; H04L 67/42; H04L 43/08; H04L 43/0817;
(Continued)

(56) References Cited

U.S. PATENT DOCUMENTS

| D379,695 S | 6/1997 | Africa |
|---|---|---|
| 6,182,157 B1 | 1/2001 | Schlener et al. |

(Continued)

FOREIGN PATENT DOCUMENTS

| CN | 102664786 A | 9/2012 |
|---|---|---|
| EP | 0831617 A2 | 3/1998 |

(Continued)

OTHER PUBLICATIONS

Examination Report from counterpart European Application No. 14847344.0, dated Aug. 28, 2018, 9 pp.
(Continued)

*Primary Examiner* — Ramy M Osman
(74) *Attorney, Agent, or Firm* — Shumaker & Sieffert, P.A.

(57) ABSTRACT

The present invention addresses the need for improved virtualized cloud infrastructure policy implementation and management in order allow real-time monitoring and optimization of virtualized resources. It provides systems and methods for real-time cloud infrastructure policy implementation and management that include a plurality of host devices, a plurality of real-time probe agents associated with the plurality of host devices operating on each of the plurality of host devices, and a policy engine communicatively coupled to the plurality of host devices and containing a policy associated with an application program deployed in at least one of the plurality of host devices. The policy engine is programmed to monitor in real time changes in deployment of the application program across the plurality
(Continued)

of host devices and to push the policy to the real-time probe agent operating on each host device on which the application program is deployed.

17 Claims, 14 Drawing Sheets

Related U.S. Application Data a continuation-in-part of application No. 14/149,621, filed on Jan. 7, 2014, now Pat. No. 10,355,997, application No. 15/084,927, which is a continuation-in-part of application No. 14/290,509, filed on May 29, 2014, now Pat. No. 9,385,959.

(60) Provisional application No. 61/882,768, filed on Sep. 26, 2013.

(51) Int. Cl.
*H04L 29/06* (2006.01)
*H04L 12/26* (2006.01)
*G06F 9/455* (2018.01)
*G06F 9/50* (2006.01)

(52) U.S. Cl.
CPC ............... *G06F 9/50* (2013.01); *H04L 41/50* (2013.01); *H04L 43/12* (2013.01); *H04L 67/02* (2013.01); *H04L 67/42* (2013.01); *H04L 43/065* (2013.01); *H04L 43/08* (2013.01)

(58) Field of Classification Search
CPC . H04L 41/50; H04L 41/5003; H04L 41/5025; H04L 41/5032; H04L 41/5067; H04L 41/0893; H04L 43/12; H04L 67/02; H04L 43/065; G06F 9/50; G06F 9/45558; G06F 9/45533
See application file for complete search history.

(56) References Cited

U.S. PATENT DOCUMENTS

| | | | |
|---|---|---|---|
| 6,493,316 B1 | 12/2002 | Chapman et al. | |
| 6,678,835 B1* | 1/2004 | Shah | H04L 41/0893 714/4.12 |
| 6,741,563 B2 | 5/2004 | Packer | |
| 6,754,228 B1 | 6/2004 | Ludwig | |
| 7,032,022 B1* | 4/2006 | Shanumgam | H04L 41/0893 707/999.009 |
| 7,389,462 B1 | 6/2008 | Wang et al. | |
| 7,433,304 B1 | 10/2008 | Galloway et al. | |
| 7,802,234 B2* | 9/2010 | Sarukkai | G06F 11/3476 717/100 |
| 8,102,881 B1 | 1/2012 | Vincent | |
| 8,527,982 B1* | 9/2013 | Sapuntzakis | G06F 9/45558 717/174 |
| 8,601,471 B2 | 12/2013 | Beaty et al. | |
| 9,258,313 B1* | 2/2016 | Knappe | H04L 63/12 |
| 9,275,172 B2 | 3/2016 | Ostermeyer et al. | |
| 9,319,286 B2* | 4/2016 | Panuganty | H04L 41/5025 |
| 9,385,959 B2 | 7/2016 | Kompella et al. | |
| 9,501,309 B2* | 11/2016 | Doherty | G06F 9/45558 |
| 9,600,307 B1* | 3/2017 | Pulkayath | G06F 9/45533 |
| 9,641,435 B1 | 5/2017 | Sivararnakrishnan | |
| 9,817,695 B2 | 11/2017 | Clark | |
| 9,830,190 B1* | 11/2017 | Pfleger, Jr. | H04L 41/082 |
| 9,900,262 B2* | 2/2018 | Testa | H04L 43/026 |
| 9,906,454 B2 | 2/2018 | Prakash et al. | |
| 9,929,962 B2 | 3/2018 | Prakash et al. | |
| 9,940,111 B2* | 4/2018 | Labocki | H04L 67/2809 |
| 10,061,657 B1* | 8/2018 | Chopra | G06F 11/1461 |
| 10,191,778 B1 | 1/2019 | Yang et al. | |
| 10,284,627 B2* | 5/2019 | Lang | H04L 67/10 |
| 2002/0031088 A1 | 3/2002 | Packer | |
| 2004/0054791 A1* | 3/2004 | Chakraborty | H04L 63/20 709/229 |
| 2004/0073596 A1* | 4/2004 | Kloninger | H04L 41/0893 709/200 |
| 2004/0088412 A1 | 5/2004 | John et al. | |
| 2005/0058131 A1 | 3/2005 | Samuels et al. | |
| 2005/0091657 A1 | 4/2005 | Priem | |
| 2006/0101144 A1 | 5/2006 | Wiryaman et al. | |
| 2006/0259733 A1 | 11/2006 | Yamazaki et al. | |
| 2006/0271680 A1 | 11/2006 | Shalev et al. | |
| 2007/0014246 A1 | 1/2007 | Aloni et al. | |
| 2007/0024898 A1 | 2/2007 | Uemura et al. | |
| 2007/0248017 A1 | 10/2007 | Hinata et al. | |
| 2008/0222633 A1 | 9/2008 | Kami | |
| 2008/0250415 A1 | 10/2008 | Illikkal et al. | |
| 2008/0253325 A1 | 10/2008 | Park et al. | |
| 2008/0270199 A1 | 10/2008 | Chess et al. | |
| 2006/0320147 | 12/2008 | Delima et al. | |
| 2009/0028061 A1 | 1/2009 | Zaencker | |
| 2009/0172315 A1 | 7/2009 | Iyer et al. | |
| 2009/0183173 A1 | 7/2009 | Becker et al. | |
| 2010/0011270 A1 | 1/2010 | Yamamoto et al. | |
| 2010/0095300 A1 | 4/2010 | West et al. | |
| 2010/0125477 A1 | 5/2010 | Mousseau et al. | |
| 2011/0072486 A1* | 3/2011 | Hadar | H04L 63/20 726/1 |
| 2011/0128853 A1 | 6/2011 | Nishimura | |
| 2011/0219447 A1* | 9/2011 | Horovitz | G06F 9/45533 726/22 |
| 2011/0276699 A1 | 11/2011 | Pedersen | |
| 2012/0002669 A1 | 1/2012 | Dietterle et al. | |
| 2012/0054330 A1 | 3/2012 | Loach | |
| 2012/0054763 A1 | 3/2012 | Srinivasan | |
| 2012/0096167 A1 | 4/2012 | Free et al. | |
| 2012/0131225 A1 | 5/2012 | Chiueh et al. | |
| 2012/0210318 A1 | 8/2012 | Sanghvi et al. | |
| 2012/0303923 A1 | 11/2012 | Behera et al. | |
| 2012/0311138 A1 | 12/2012 | Inamdar et al. | |
| 2012/0324445 A1 | 12/2012 | Dow et al. | |
| 2013/0003553 A1 | 1/2013 | Samuels et al. | |
| 2013/0042003 A1 | 2/2013 | Franco et al. | |
| 2013/0044629 A1 | 2/2013 | Biswas et al. | |
| 2013/0163428 A1 | 6/2013 | Lee et al. | |
| 2013/0205037 A1 | 8/2013 | Biswas | |
| 2013/0263209 A1* | 10/2013 | Panuganty | H04L 41/5025 726/1 |
| 2013/0297802 A1* | 11/2013 | Laribi | H04L 12/6418 709/226 |
| 2014/0007094 A1 | 1/2014 | Jamjoom et al. | |
| 2014/0019807 A1 | 1/2014 | Harrison et al. | |
| 2014/0025890 A1 | 1/2014 | Bert et al. | |
| 2014/0026133 A1 | 1/2014 | Parker | |
| 2014/0067779 A1* | 3/2014 | Ojha | G06F 17/30144 707/694 |
| 2014/0123133 A1 | 5/2014 | Luxenberg | |
| 2014/0130039 A1 | 5/2014 | Chaplik et al. | |
| 2014/0189684 A1 | 7/2014 | Zaslavsky et al. | |
| 2014/0192639 A1 | 7/2014 | Smirnov | |
| 2014/0196038 A1* | 7/2014 | Kottomtharayil | G06F 9/45533 718/1 |
| 2014/0241159 A1 | 8/2014 | Kakadia et al. | |
| 2014/0258535 A1 | 9/2014 | Zhang | |
| 2014/0304320 A1 | 10/2014 | Taneja et al. | |
| 2014/0313904 A1* | 10/2014 | Brunet | H04L 41/5038 370/241 |
| 2014/0334301 A1 | 11/2014 | Billaud et al. | |
| 2014/0372513 A1* | 12/2014 | Jones | G06F 9/5072 709/203 |
| 2015/0067404 A1* | 3/2015 | Eilam | G06F 11/3006 714/38.1 |
| 2015/0085665 A1 | 3/2015 | Kompella et al. | |
| 2015/0089500 A1 | 3/2015 | Kompella et al. | |
| 2015/0127912 A1 | 5/2015 | Solihin | |
| 2015/0169306 A1* | 6/2015 | Labocki | H04L 67/10 717/176 |
| 2015/0193245 A1* | 7/2015 | Cropper | G06F 9/45533 718/1 |

(56) References Cited

U.S. PATENT DOCUMENTS

| | | | |
|---|---|---|---|
| 2015/0215214 | A1 | 7/2015 | Ng et al. |
| 2015/0234674 | A1* | 8/2015 | Zhong ................ G06F 9/45558 718/1 |
| 2015/0277957 | A1 | 10/2015 | Shigeta |
| 2015/0378743 | A1* | 12/2015 | Zellermayer ....... G06F 9/45558 713/2 |
| 2015/0381711 | A1* | 12/2015 | Singh ................. H04L 41/0813 709/221 |
| 2016/0080206 | A1 | 3/2016 | Prakash et al. |
| 2016/0080207 | A1 | 3/2016 | Prakash et al. |
| 2016/0092257 | A1* | 3/2016 | Wang ................. H04L 41/0893 718/1 |
| 2016/0139948 | A1 | 5/2016 | Beveridge et al. |
| 2016/0154665 | A1* | 6/2016 | Iikura ................ G06F 9/45558 718/1 |
| 2016/0239331 | A1 | 8/2016 | Tamura |
| 2016/0259941 | A1* | 9/2016 | Vasudevan ............. H04L 63/20 |
| 2016/0269302 | A1 | 9/2016 | Kompella et al. |
| 2016/0277249 | A1* | 9/2016 | Singh ..................... H04L 67/42 |
| 2016/0366233 | A1* | 12/2016 | Le ........................... H04L 67/16 |
| 2016/0378519 | A1 | 12/2016 | Gaurav et al. |
| 2017/0033995 | A1 | 2/2017 | Banka et al. |
| 2017/0093918 | A1* | 3/2017 | Banerjee ................. H04L 67/22 |
| 2017/0094377 | A1 | 3/2017 | Herdrich et al. |
| 2017/0094509 | A1* | 3/2017 | Mistry .................. H04L 67/141 |
| 2017/0116014 | A1* | 4/2017 | Yang ................... G06F 11/3495 |
| 2017/0160744 | A1 | 6/2017 | Chia et al. |
| 2017/0171245 | A1* | 6/2017 | Lee ......................... H04L 63/20 |
| 2017/0235677 | A1 | 8/2017 | Sakaniwa et al. |
| 2017/0262375 | A1 | 9/2017 | Jenne et al. |
| 2018/0088997 | A1 | 3/2018 | Min |
| 2018/0097728 | A1 | 4/2018 | Bodi Reddy et al. |
| 2018/0139100 | A1 | 5/2018 | Nagpal et al. |
| 2018/0157511 | A1 | 6/2018 | Krishnan et al. |
| 2018/0300182 | A1 | 10/2018 | Hwang et al. |

FOREIGN PATENT DOCUMENTS

| | | |
|---|---|---|
| EP | 2687991 A2 | 1/2014 |
| WO | 2009089051 A2 | 7/2009 |
| WO | 2013101843 A2 | 7/2013 |
| WO | 2013184846 A1 | 12/2013 |
| WO | 2015048326 A1 | 4/2015 |

OTHER PUBLICATIONS

First Office Action and Search Report, and translation thereof, from counterpart Chinese Application No. 2014800588702, dated Sep. 28, 2018, 23 pp.
Final Office Action from U.S. Appl. No. 14/149,621, dated Oct. 25, 2018, 22 pp.
Notice of Allowance from U.S. Appl. No. 15/162,589, dated Jun. 22, 2018, 7 pp.
Response to Extended Search Report dated Jan. 5, 2016, from counterpart European Application No. 17163963.6, filed Jul. 31, 2018, 16 pp.
"OpenStack Docs: Manage projects, users, and roles," Openstack Keystone service version 12.0.1.dev19, Jul. 26, 2018, 7 pp.
"AppFormix Metrics," AppFormix, Aug. 6, 2017, 6 pp.
International Search Report and Written Opinion for PCT Application Serial No. PCT/US2016/042606, dated Sep. 30, 2016, 12 pp.
Final Office Action for U.S. Appl. No. 14/149,621, dated Dec. 20, 2016, 23 pp.
International Search Report and Written Opinion for International Application Serial No. PCT/US2014/057514, dated Dec. 31, 2014, 10 pp.
Garnage et al., "Protocol Responsibility Offloading to Improve TCP Throughput in Virtualized Environments," ACM Transactions on Computer Systems, 31(3) Article 7, Aug. 2013, pp. 7:1-7:34.
Gamage et al., "Opportunistic flooding to improve TCP transmit performance in virtualized clouds," Proceedings of the 2nd ACM Symposium on Cloud Computing, Oct. 26, 2011, 14 pp.
Kangariou et al., "vSnoop: Improving TCP Throughput in Virtualized Environments via Acknowledgement Offload," International Conference for High Performance Computing, Networking, Storage and Analysis (SC), Nov. 2010, pp. 1-11.
Thierry et al., "Improved TCP Performance in Wireless IP Networks through Enhanced Opportunistic Scheduling Algorithms," IEEE Global Telecommunications Conference, vol. 5, 2004, pp. 2744-2748.
Office Action for U.S. Appl. No. 14/149,621, dated May 6, 2016, 27 pp.
Office Action for U.S. Appl. No. 14/290,509, dated Nov. 10, 2015, 24 pp.
Office Action for U.S. Appl. No. 14/290,509, dated Mar. 9, 2016, 10 pp.
"Transmission Control Protocol," DARPA Internet Program Protocol Specification, Sep. 1981, RFC 793, 90 pp.
International Preliminary Report on Patentability from International Application No. PCT/US2014/057514, dated Mar. 29, 2016, 11 pp.
Response to Final Office Action dated Dec. 20, 2016, from U.S. Appl. No. 14/149,621, filed Feb. 13, 2017, 24 pp.
Advisory Action from U.S. Appl. No. 14/149,621, dated Feb. 21, 2017, 3 pp.
Amendment in Response to Final Office Action dated Dec. 20, 2016 and Advisory Action dated Feb. 21, 2017, from U.S. Appl. No. 14/149,621, filed Mar. 20, 2017, 13 pp.
Office Action from U.S. Appl. No. 14/149,621, dated Apr. 14, 2017, 20 pp.
Extended Search Report from counterpart European Application No. 14847344.0, dated May 2, 2017, 8 pp.
Response to Office Action dated Apr. 14, 2017, from U.S. Appl. No. 14/149,621, filed Jul. 14, 2017, 13 pp.
International Search Report of International Application No. PCT/US2014/057514, dated Dec. 31, 2014, 2 pp.
Response to Extended European Search Report dated May 2, 2017, from counterpart European Application No. 14847344.0, filed Nov. 17, 2017, 19 pp.
Hopps, "Analysis of an Equal-Cost Multi-Path Algorithm," RFC 2992, Network Working Group, Nov. 2000, 8 pp.
Ramakrishnan et al., "The Addition of Explicit Congestion Notification (ECN) to IP," RFC 3168, Network Working Group, Sep. 2001, 63 pp.
Roy, "AppFormix and Intel RDT Integration: Orchestrating Virtual Machines on OpenStack," AppFormix Blog, Apr. 1, 2016, 5 pp.
Roy, "CPU shares insufficient to meet application SLAs," APPFORMIX-TR-2016-1, Mar. 2016, 3 pp.
Roy, "Meet Your Noisy Neighbor, Container," AppFormix Blog, Mar. 31, 2016, 8 pp.
Singh, "AppFormix: Realize the Performance of Your Cloud Infrastructure—Solution Brief," AppFormix, Intel® Corporation, Mar. 27, 2016, 7 pp.
"Creating Projects in OpenStack for Configuring Tenants in Contrail," Juniper Networks, Inc., Contrail, Jan. 16, 2015, 2 pp.
"Host Aggregates," OpenStack Docs, accessed from https://docs.openstack.org/nova/latest/user/aggregates.html, accessed on Feb. 14, 2018, 3 pp.
"Improving Real-Time Performance by Utilizing Cache Allocation Technology—Enhancing Performance via Allocation of the Processor's Cache," White Paper, Intel® Corporation, Apr. 2015, 16 pp.
U.S. Appl. No. 14/811,957, by Juniper Networks, Inc. (Inventors: Banka et al.), filed Jul. 29, 2015.
Extended Search Report from counterpart European Application No. 17163963.6, dated Jan. 5, 2018, 11 pp.
Office Action from U.S. Appl. No. 15/162,589, dated Jan. 30, 2018, 19 pp.
Office Action from U.S Appl. No. 14/149,621, dated Feb. 6, 2018, 21 pp.
Response filed Apr. 30, 2018 to the Office Action from U.S. Appl. No. 15/162,589, dated Jan. 30, 2018, 11 pp.
Response filed May 7, 2018 to the Office Action from U.S Appl. No. 14/149,621, dated Feb. 6, 2018, 6 pp.
U.S. Appl. No. 15/946,645, by Juniper Networks, Inc. (Inventors: Chitalia et al.), filed Apr. 5, 2018.

(56) References Cited

OTHER PUBLICATIONS

U.S. Appl. No. 62/487,254, by Juniper Networks, Inc. (Inventors: Roy et al.), filed Apr. 19, 2017.
U.S. Appl. No. 15/846,400, by Juniper Networks, Inc. (Inventors: Chitalia et al.), filed Dec. 19, 2017.
U.S. Appl. No. 15/797,098, by Juniper Networks, Inc. (Inventors: Roy et al.), filed Oct. 30, 2017.
Response filed Jan. 2, 2019 to the Communication pursuant to Article 94(3) EPC dated Aug. 28, 2018 from counterpart European Application No. 14847344.0, 19 pp.
Amendment in Response to Office Action dated Oct. 25, 2018, from U.S. Appl. No. 14/149,621, filed Dec. 26, 2018, 14 pp.
Advisory Action from U.S Appl. No. 14/149,621, dated Jan. 14, 2019, 3 pp.
Notice of Allowance from U.S. Appl. No. 14/149,621, dated Mar. 20, 2019, 10 pp.
Second Office Action, and translation thereof, from counterpart Chinese Application No. 2014800588702, dated May 27, 2019, 11 pp.

* cited by examiner

REAL-TIME CLOUD-INFRASTRUCTURE POLICY IMPLEMENTATION AND MANAGEMENT

CROSS-REFERENCE TO RELATED APPLICATIONS

This application is a continuation-in-part of U.S. patent application Ser. No. 14/811,957, entitled "ASSESSMENT OF OPERATIONAL STATES OF A COMPUTING ENVIRONMENT," filed on Jul. 29, 2015 and is also a continuation-in-part of U.S. patent application Ser. No. 14/149,621, entitled "SYSTEM AND METHOD FOR IMPROVING TCP PERFORMANCE IN VIRTUALIZED ENVIRONMENTS," filed on Jan. 7, 2014, and U.S. patent application Ser. No. 14/290,509, entitled "SYSTEM AND METHOD FOR IMPROVING TCP PERFORMANCE IN VIRTUALIZED ENVIRONMENTS," filed on May 29, 2014 (which both claim the benefit of priority under 35 U.S.C. § 119(e) of U.S. Provisional Patent Application Ser. No. 61/882,768, entitled "SYSTEM AND METHOD FOR IMPROVING TCP PERFORMANCE IN VIRTUALIZED ENVIRONMENTS," filed on Sep. 26, 2013) each of which are herein incorporated by reference in their entireties.

BACKGROUND

Data centers—including virtualized data centers—are a core foundation of the modern information technology (IT) infrastructure. Virtualization provides several advantages. One advantage is that virtualization can provide significant improvements to efficiency, as physical machines have become sufficiently powerful with the advent of multicore architectures with a large number of cores per physical CPU. Further, memory has become extremely cheap today. Thus, one can consolidate a large number of virtual machines on to one physical machine. A second advantage is that virtualization provides significant control over the infrastructure. As computing resources become fungible resources, such as in the cloud model, provisioning and management of the compute infrastructure becomes easier. Thus, enterprise IT staff prefer virtualized clusters in data centers for their management advantages in addition to the efficiency and better return on investment (ROI) that virtualization provides.

Various kinds of virtual machines exist, each with different functions. System virtual machines (also known as full virtualization VMs) provide a complete substitute for the targeted real machine and a level of functionality required for the execution of a complete operating system. A hypervisor uses native execution to share and manage hardware, allowing multiple different environments, isolated from each other, to be executed on the same physical machine. Modern hypervisors use hardware-assisted virtualization, which provides efficient and full virtualization by using virtualization-specific hardware capabilities, primarily from the host CPUs. Process virtual machines are designed to execute a single computer program by providing an abstracted and platform-independent program execution environment. Some virtual machines are designed to also emulate different architectures and allow execution of software applications and operating systems written for another CPU or architecture. Operating-system-level virtualization allows the resources of a computer to be partitioned via the kernel's support for multiple isolated user space instances, which are usually called containers and may look and feel like real machines to the end users.

The present invention relates to systems and methods for cloud infrastructure policy implementation and management in order to allow real-time monitoring and optimization of virtualized resources.

BRIEF DESCRIPTION OF THE DRAWINGS

The accompanying drawings are an integral part of the disclosure and are incorporated in and constitute a part of this specification. The drawings illustrate example, non-limiting embodiments and, in conjunction with the description and claims set forth herein, serve to explain at least some of the principles of this disclosure.

DETAILED DESCRIPTION

The present invention addresses the need for improved cloud infrastructure policy implementation and management in order allow real-time monitoring and optimization of host resources. In conventional approaches for monitoring hosted resources, a static rule would be deployed to host servers that would cause an entity on the host to capture the metrics specified in the rule and export the metrics to some external data source. From there, the exported data would be used for analysis and implementation of a policy based on the analysis of the exported data. This paradigm of deploying a static rule, capturing data, storing the data, processing the data, analyzing the data, and then displaying results to the user has several shortcomings that the present invention addresses.

In the present invention, instead of a static rule that is implemented in one place, a policy is set at a high level for an application. As the demand for an application increases, the instances of the application scale and are spun up on the hosting devices through more virtual machines (VMs) and/or containers for example. Then as that application is deployed across many VMs and/or containers (which can be distributed across many servers), the systems and methods of the present invention helps determine the appropriate policy and ensure that the policy is available on the right set of servers for the application. The systems and methods of the present invention treat the analysis and control aspect as a policy that follows the application no matter where it goes. Accordingly, even though application VMs and/or containers can move, the present invention ensures that the right policy moves automatically with the application across VMs and/or containers. This provides a policy at the application level so that for a given application, if a condition happens anywhere in the infrastructure, the appropriate action is taken.

Moreover, where conventional approaches can introduce latency and can be limited with respect to richness of details of the monitored performance metrics, the present invention allows generation of real-time or nearly real-time events and/or alarms based at least on an operational state of a host device. In the present invention, the policy is implemented on the host, directly at the source of the data and treats the whole aspect of analysis as a policy itself. The present invention detects a rule violation directly at the host and takes the appropriate action, including (if appropriate) action directly on the host.

Figure 1:
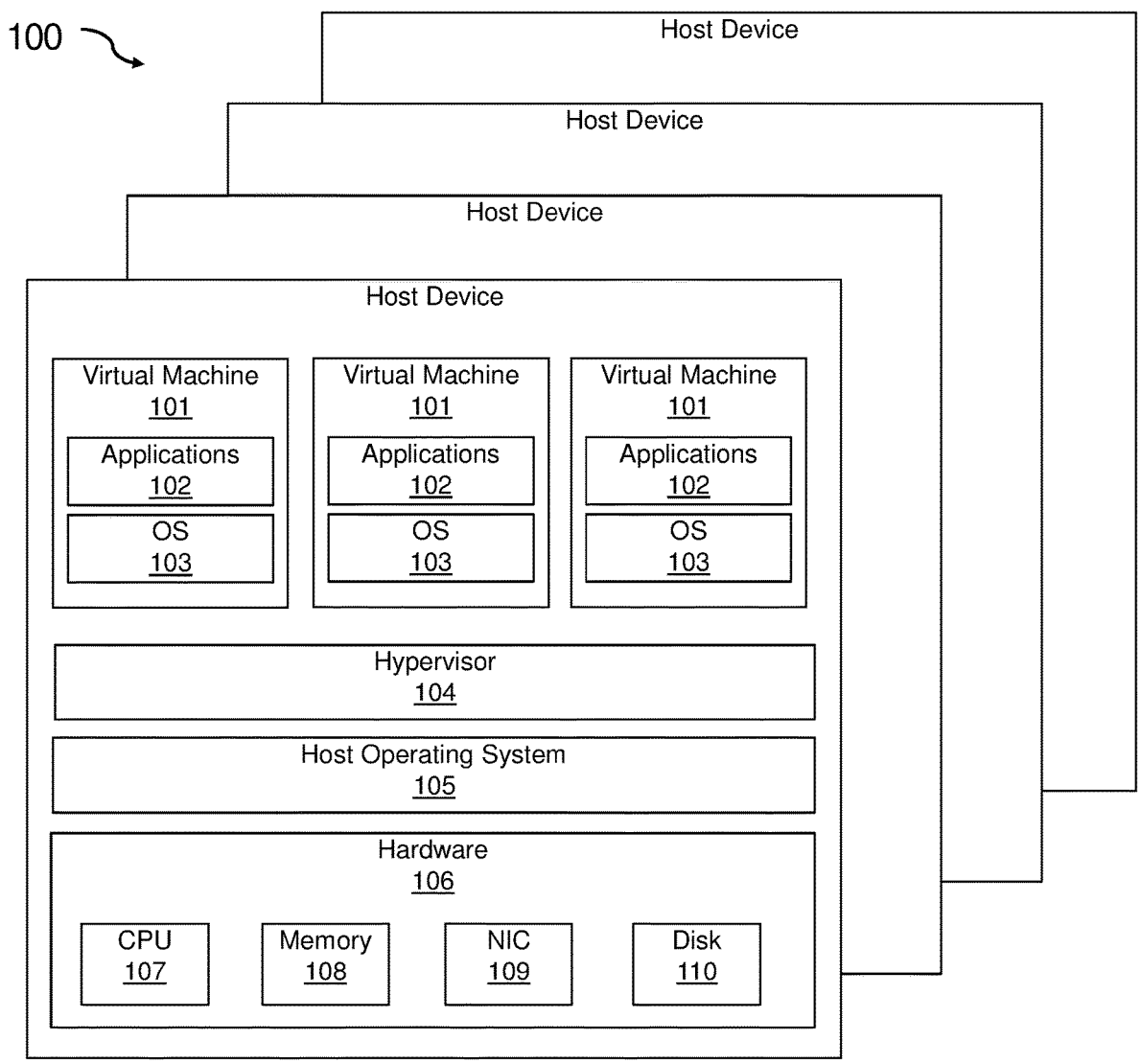
FIG. 1 illustrates a plurality of host devices that may be used in the present invention.
Figure 2:
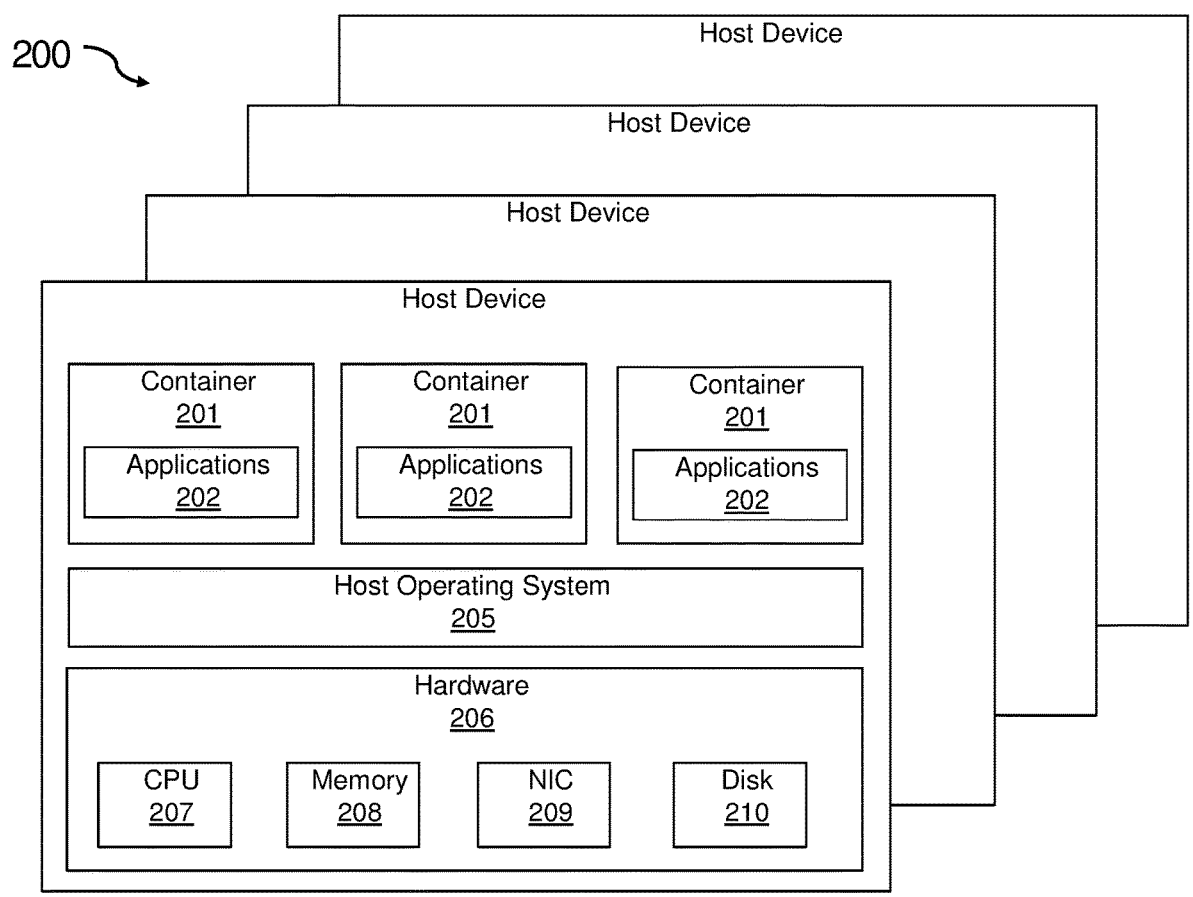
FIG. 2 illustrates a plurality of host devices that may be used in the present invention.
Figure 3:
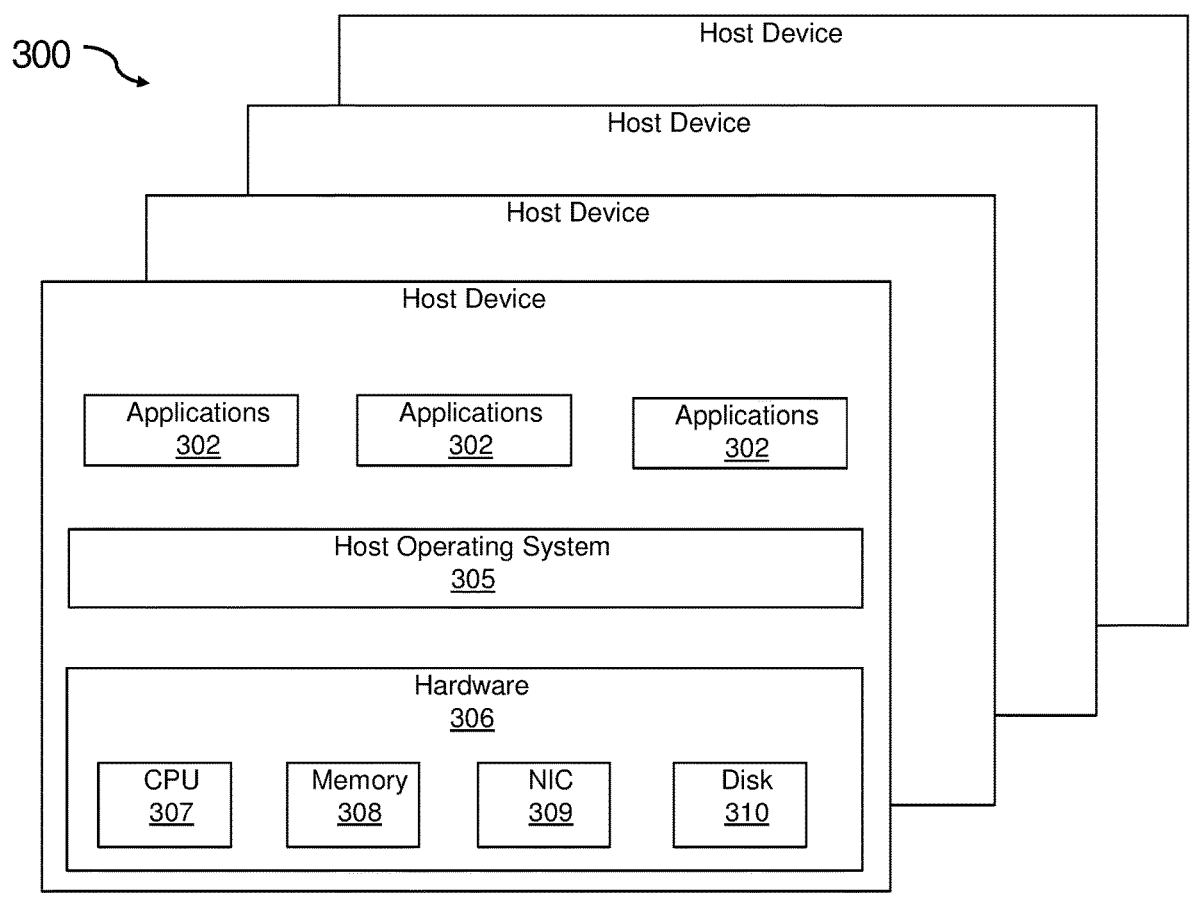
FIG. 3 illustrates a plurality of host devices that may be used in the present invention.

FIGS. 1, 2, and 3 illustrate a plurality of host devices 100, 200, 300 that may be used in the present invention. The host devices 100 of FIG. 1 are exemplary system VMs, or full virtualization VMs, that provide a complete substitute for the targeted real machine and a level of functionality required for the execution of a complete operating system 103. The host devices 200 of FIG. 2 are exemplary operating-system-level virtualization systems that allow the resources of a computer to be partitioned via the kernel's support for multiple isolated user space instances, which are usually called containers and may look and feel like real machines to the end users. The present invention may be used with various types of virtualization. For example, the embodiments of the present invention may be used with management for virtual machines (such as OpenStack) and management for containers (such as Kubernetes). The host devices 300 of FIG. 3 are exemplary physical host devices that may not use virtualization. These images show host devices 100, 200, 300 using full virtualization VMs, operating-system-level virtualization systems, and physical hosts that do not use virtualization. The present invention may be used with any of these types of host devices as well as in hybrid environments with combinations of these devices across single or multiple host devices.

As illustrated in FIG. 1, each of the host devices 100 includes hardware 106 that may include processors (or CPUs) 107, memory 108, network interface cards (NICs) 109, and disk drives 110. The disk drives 110 may include solid state drives or hard disk drives or some combination of the two. On the hardware, the host devices 100 run a host operating system 105. The host devices 100 also include a hypervisor 104 to share and manage the hardware 106, allowing multiple different environments 101, isolated from each other, to be executed on the same physical machine 100. The hypervisor 104 may use hardware-assisted virtualization, which provides efficient and full virtualization by using virtualization-specific hardware capabilities, primarily from the host CPUs 107. Each host device 100 includes one or more virtual machines 101 which each include a guest operating system 103 and one or more application programs (or applications) 102 running on the guest operating systems 103.

Similarly, as shown in FIG. 2, each of the host devices 200 includes hardware 206 that may include processors (or CPUs) 207, memory 208, network interface cards (NICs) 209, and disk drives 210. The disk drives 210 may include solid state drives or hard disk drives or some combination of the two. On the hardware, the host devices 200 run a host operating system 205. Each host device 200 includes one or more containers 201 which each include one or more applications 202.

As shown in FIG. 3, each of the physical host devices 300 includes hardware 306 that may include processors (or CPUs) 307, memory 308, network interface cards (NICs) 309, and disk drives 310. The disk drives 310 may include solid state drives or hard disk drives or some combination of the two. On the hardware, the host devices 300 run a host operating system 305. Each host device 300 includes one or more applications 202 running on the host operating system 305.

Figure 4:
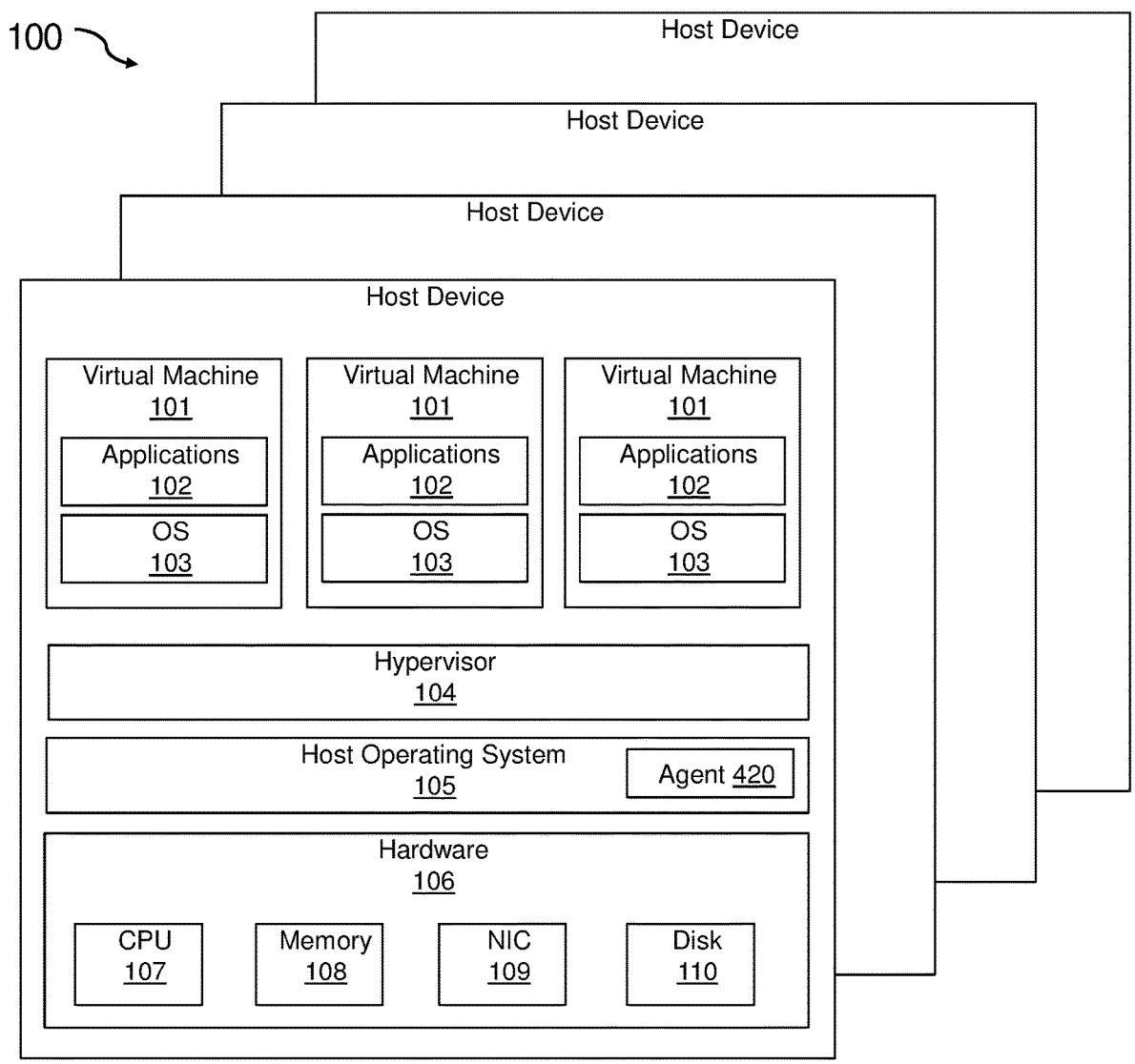
FIG. 4 illustrates a plurality of VM host devices as shown in FIG. 1 which also include a real-time probe agent operating on each of the plurality of host devices in accordance with one or more embodiments of the disclosure.
Figure 5:
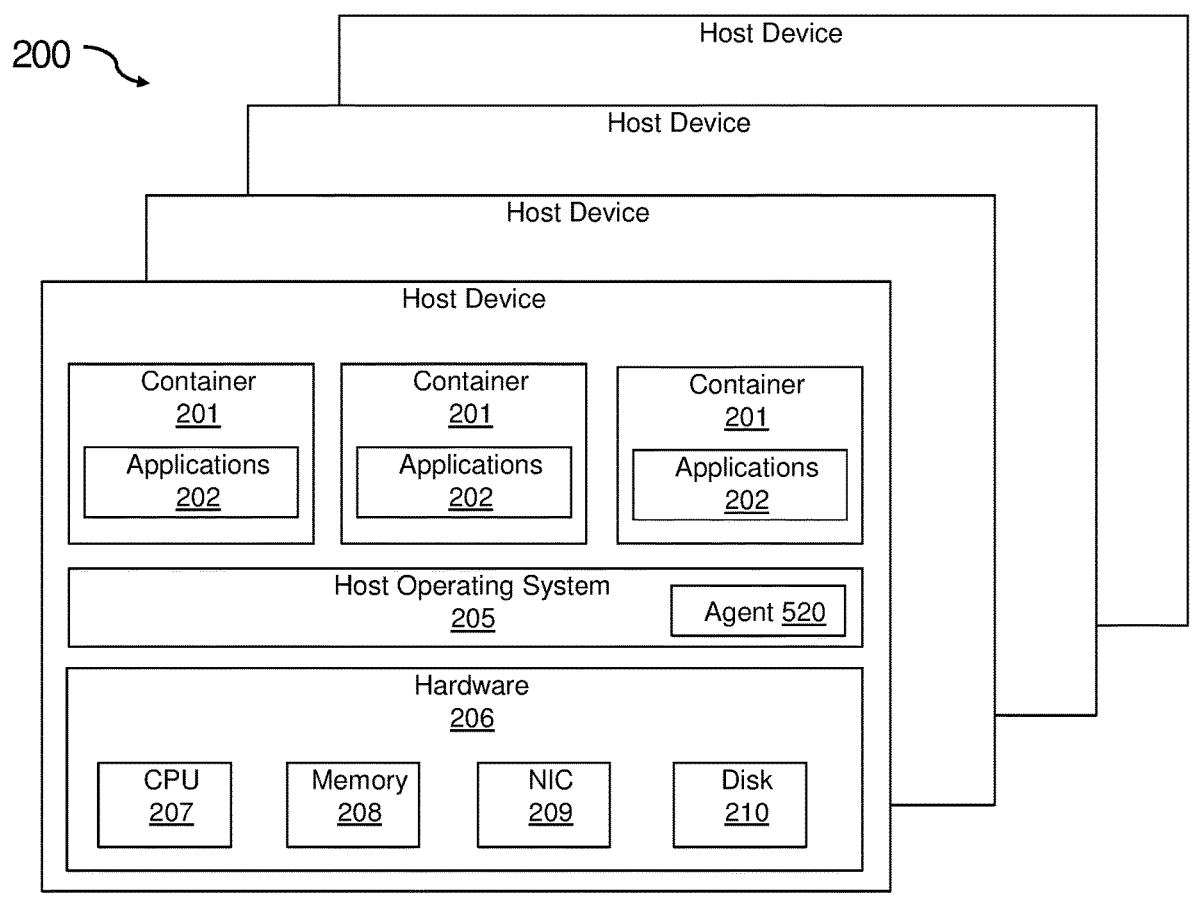
FIG. 5 illustrates a plurality of container host devices as shown in FIG. 2 which also include a real-time probe agent operating on each of the plurality of host devices in accordance with one or more embodiments of the disclosure.
Figure 6:
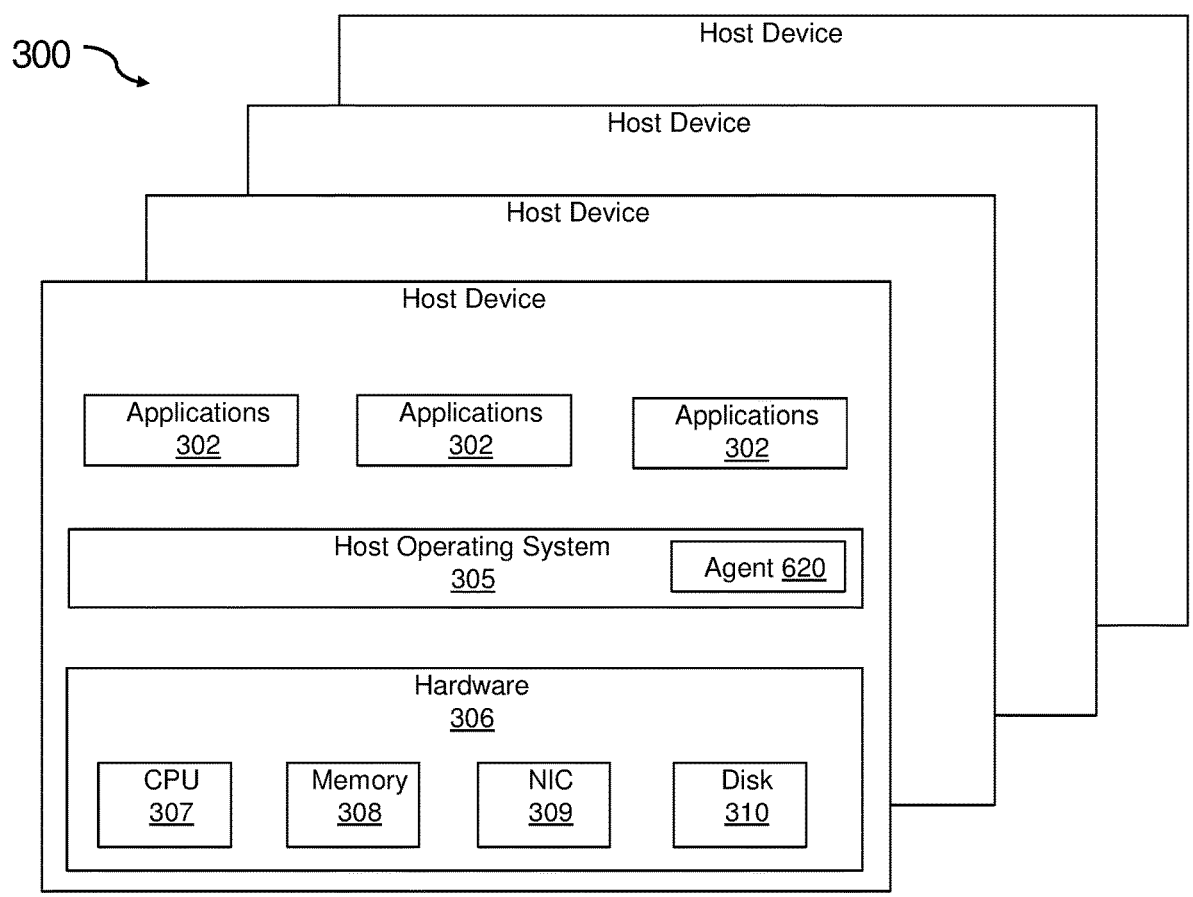
FIG. 6 illustrates a plurality of physical host devices as shown in FIG. 3 which also include a real-time probe agent operating on each of the plurality of host devices in accordance with one or more embodiments of the disclosure.

FIG. 4 illustrates a plurality of VM host devices 100 as shown in FIG. 1 which also include a real-time probe agent 420 operating on each of the plurality of host devices. FIG. 5 illustrates a plurality of container host devices 200 as shown in FIG. 2 which also include a real-time probe agent 520 operating on each of the plurality of host devices. And FIG. 6 illustrates a plurality of host devices 300 as shown in FIG. 3 which also include a real-time probe agent 620 operating on each of the plurality host devices. The real-time probe agent 420, 520, 620 executing in the host devices 100, 200, 300 can monitor some or all of the performance metrics that are available in the host devices 100, 200, 300 and can analyze the monitored information in order to generate operational information and/or intelligence associated with an operational state of the host devices 100, 200, 300 and/or a computing component associated therewith. The monitoring and analysis can be performed locally at the host devices 100, 200, 300 in real-time or nearly real-time.

In an environment in which the VMs 101, containers 201, or non-virtualized applications 302 share the host device, the real-time probe agent 420, 520, 620 can monitor and analyze resource utilization attributed to each of the VMs 101, containers 201, and/or applications 302 thus providing a stream of real-time metrics of resource consumption according to computing component that consumes the resource. Analysis of the monitored information can be utilized to update first control information indicative of occurrence of an event and/or second control information indicative of presence or absence of an alarm condition. The control information can be sent to a remote device to update information and/or intelligence related to performance conditions of the host device. In each case, the source of the data is a host. For example, physical sever contain hardware and other components including many CPUs, memory bank, hard drives, network cards, motherboard, operating systems on the source, VMs and containers. The present invention may collect information from any of these components at the host such as what is happening to the physical hardware (hardware, temperature, errors), the system layer (operating system layer), how much memory being used, how the memory is being shared, or the swap consumption.

Figure 7:
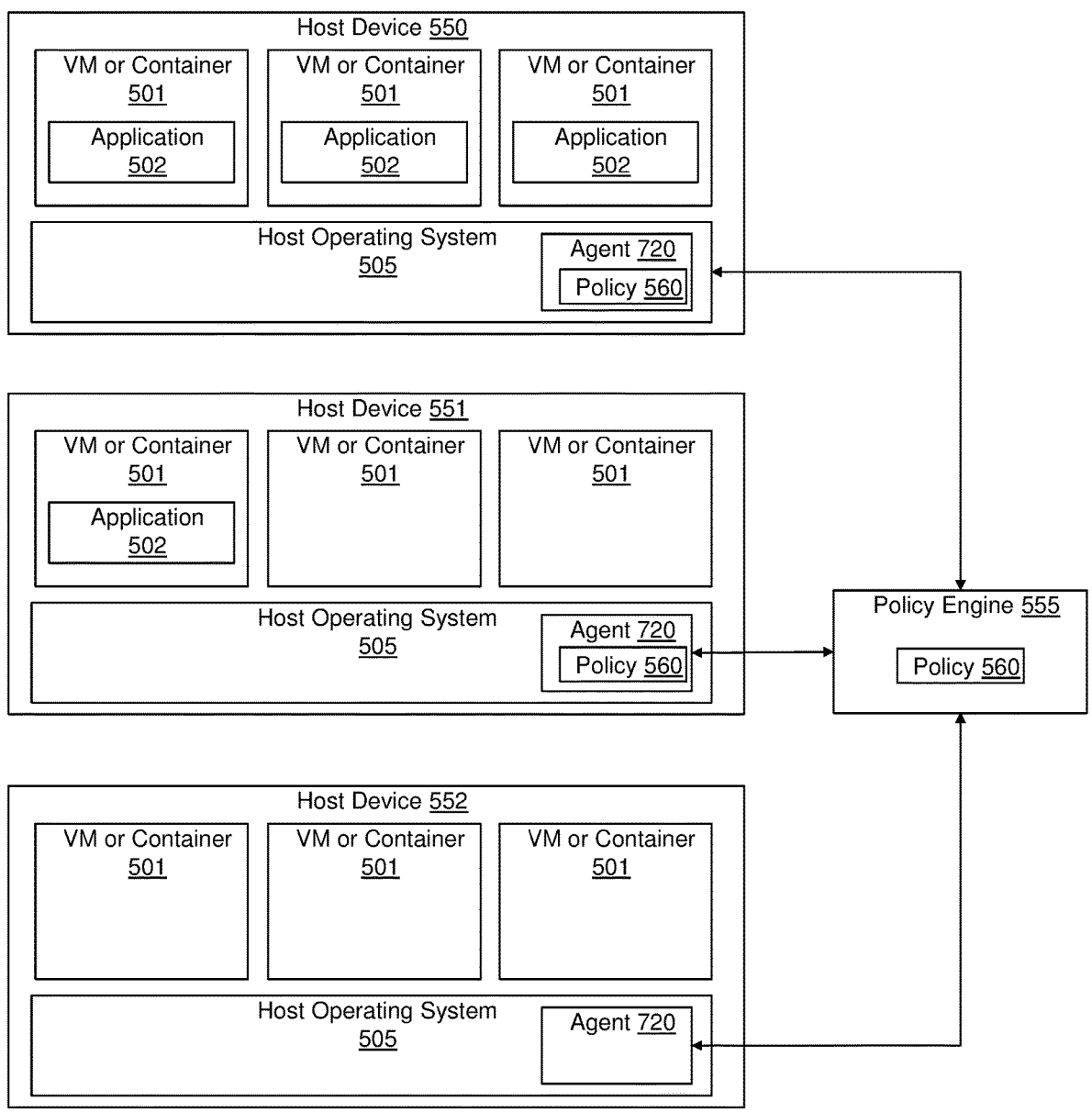
FIG. 7 illustrates an embodiment of a system of the present invention for real-time cloud infrastructure policy implementation and management.

FIG. 7 illustrates an embodiment of a system 700 of the present invention for real-time cloud infrastructure policy implementation and management. In each of the figures, the arrows indicate communication links that permit the exchange of information (e.g., data, metadata, and/or signaling) between the components. In some embodiments, each of the communication links can include an upstream link (or uplink (UL)) and a downstream link (or downlink (DL)), and can be embodied in or can include wireless links (e.g., deep-space wireless links and/or terrestrial wireless links); wireline links (e.g., optic-fiber lines, coaxial cables, and/or twisted-pair lines); routers; switches; server devices; aggregator devices; bus architectures; a combination of the foregoing; or the like. Additionally, inside each of the boxes, the components are also connected to each other by communication links like those described above. As shown, the system 500 includes one or more host device 550, 551, 552 running a host operating system 505. The host operating system 505 may be unique to each of the host devices 550, 551, 552, but for simplicity is shown as 505 in each device. The host devices 550, 551, 552 represent devices with various types of virtualization including VMs and containers 501 as illustrated in FIGS. 3 and 4. The system 500 also includes a real-time probe agent 720 operating on each of the host devices 550, 551, 552. Each of the VMs or containers 501 may be running multiple applications (not shown). Included in those applications, each of the VMs or containers 501 may be running a specific application 502. As illustrated in FIG. 5, the specific application 502 is only running on some of the VMs or containers 501 in the host devices 550, 551.

The system 500 includes a policy engine 555 communicatively coupled to the host devices 550, 551, 552. The policy engine 555 contains a policy 560 associated with the specific application 502. The policy engine 555 is programmed to determine on which of the host devices 550, 551, 552 the specific application 502 is deployed as well as to monitor changes in deployment of the application 502 across the host devices 550, 551, 552 and to push the policy 560 to the real-time probe agent 520 on each of the host devices 550, 551 on which the application is deployed. As shown in FIG. 7, the specific application 502 is only deployed on host devices 550 and 551. Accordingly, the policy engine 555 only pushes the policy 560 to the real-time probe agent 720 on host devices 550 and 551. The policy engine 555 is also programmed to retract the policy 560 if it determines that a host device is no longer running the specific application 502 associated with the policy 560.

As shown with FIG. 7, the systems and methods of the present invention ensure that the right policy is implemented at the right host. For example, in the case of OpenStack, a user my go to an OpenStack client interface and tell the system the user needs ten VMs for an application. OpenStack picks what servers to use for the ten VMs, and then the system hosts the ten VMs on the servers. The systems and methods of the present invention ensure that the policy set for the application is implemented on the servers hosting the ten VMs.

Figure 8:
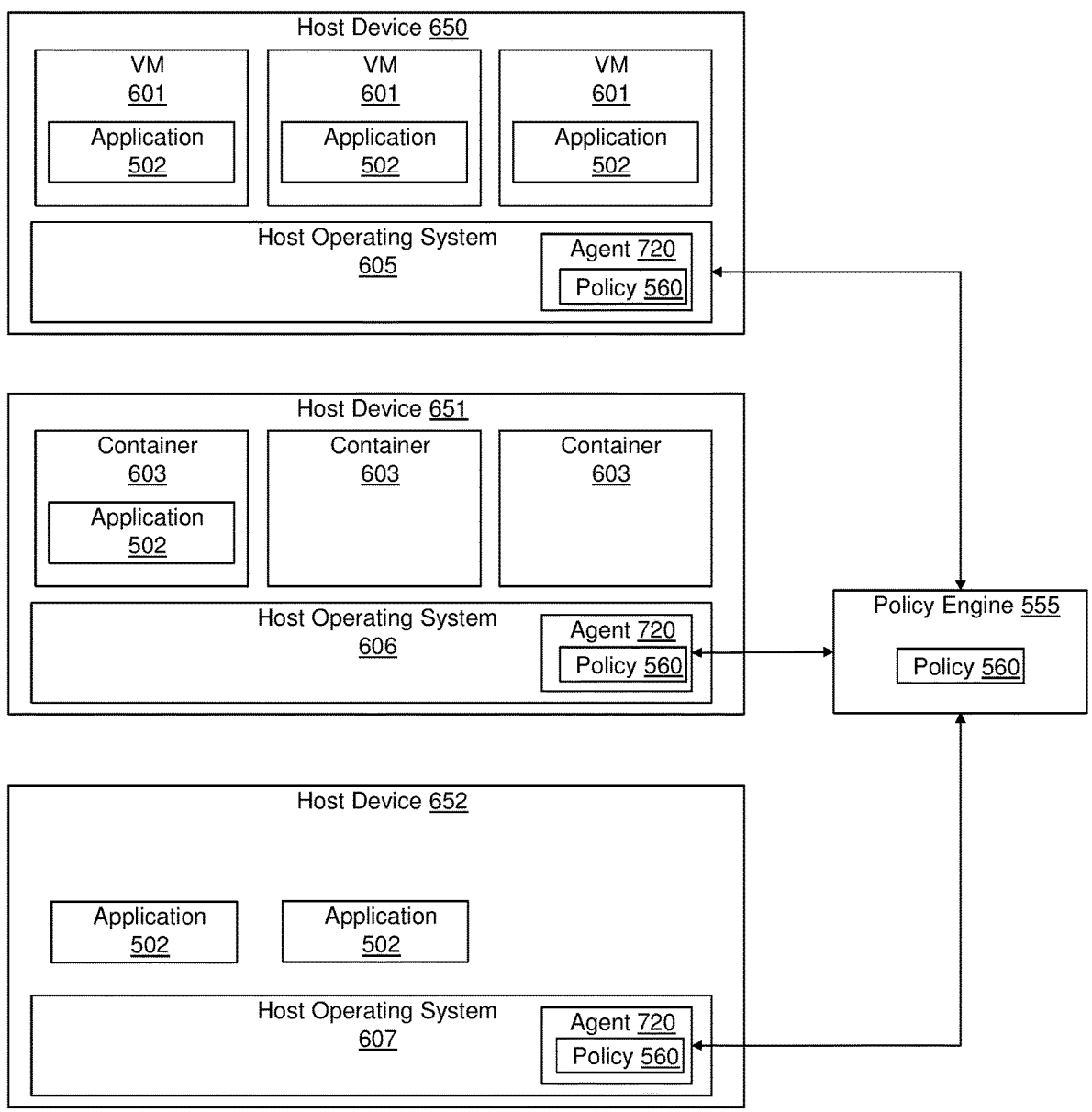
FIG. 8 illustrates an embodiment of a system of the present invention for real-time cloud infrastructure policy implementation and management.

As shown in FIG. 8, the system 800 like that shown in FIG. 7 may include a hybrid environment with host devices 650, 651, 652 with virtual machines 601, containers 603, or physical hosts. Additionally, each host device may include a combination of these. As with the system in FIG. 7, one or more of host devices 650, 651, 652 is running a host operating system 605, 606, 607. The host operating system 605, 606, 607 may be unique to each of the host devices 650, 651, 652. The system 600 also includes a real-time probe agent 720 operating on each of the host devices 650, 651, 652. Each of the VMs 601 or containers 603 or non-virtualized host devices 652 may be running multiple applications (not shown). Included in those applications, each of the VMs 601 or containers 603 or non-virtualized host devices 652 may be running a specific application 502.

The system 800 includes a policy engine 555 communicatively coupled to the host devices 650, 651, 652. The policy engine 555 contains a policy 560 associated with the specific application 502. The policy engine 555 is programmed to determine on which of the host devices 650, 651, 652 the specific application 502 is deployed as well as to monitor changes in deployment of the application 502 across the host devices 650, 651, 652 and to push the policy 560 to the real-time probe agent 720 on each of the host devices 650, 651, 652 on which the application is deployed. As shown in FIG. 8, the specific application 502 is deployed on host devices 650, 651, and 652. Accordingly, the policy engine 555 pushes the policy 560 to the real-time probe agent 720 on host devices 650, 651, and 652. The policy engine 555 is also programmed to retract the policy 560 if it determines that a host device is no longer running the specific application 502 associated with the policy 560.

Figure 9:
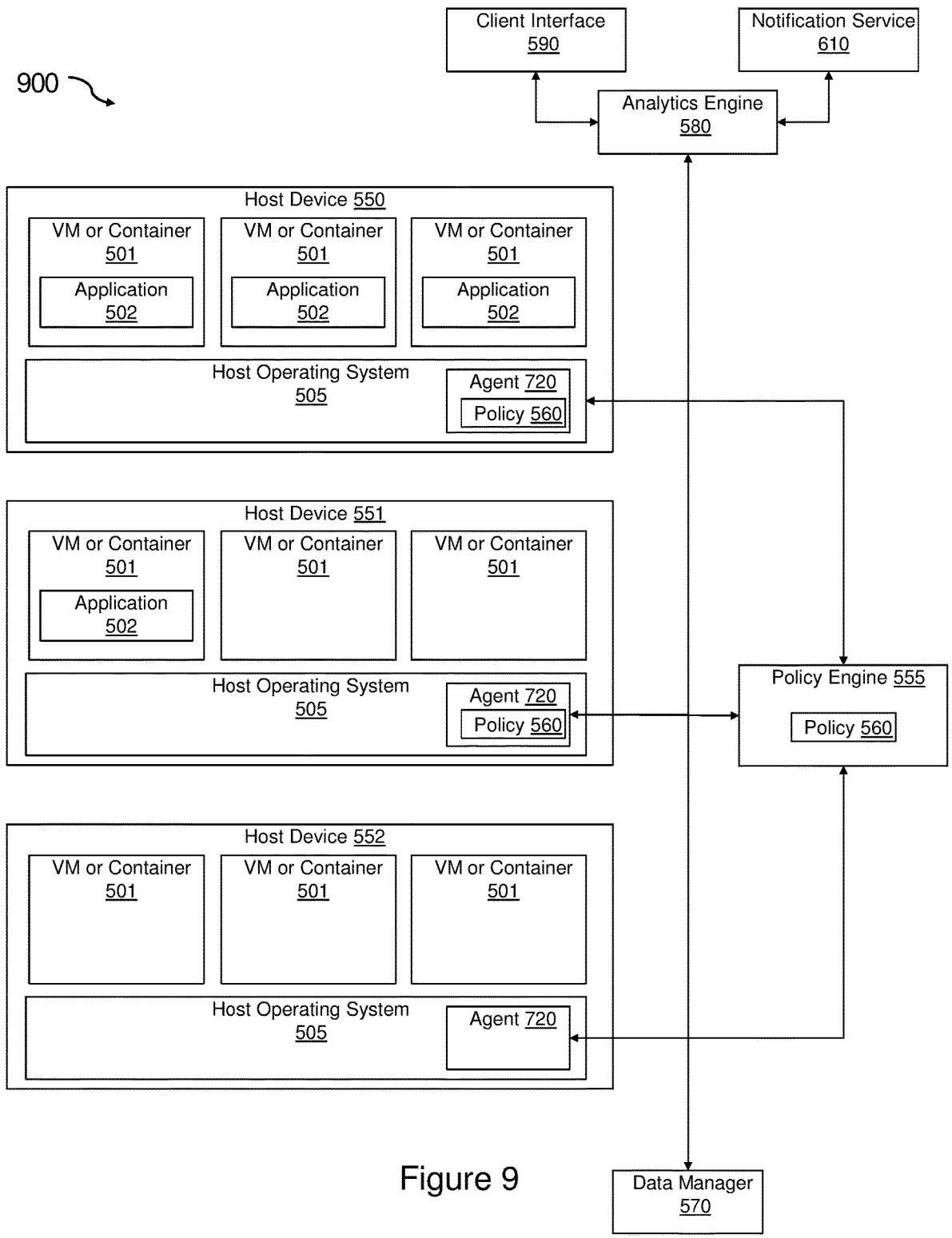
FIG. 9 illustrates another embodiment of a system of the present invention for real-time cloud infrastructure policy implementation and management.

As shown in FIG. 9, the system 900 as shown in FIG. 7 may include a data manager 570 and an analytics engine 580 communicatively coupled to the host devices 550, 551, 552. In some embodiments, the policy 560 includes instructions to cause the real-time probe agent 720 in each of the host devices 550, 551 to monitor one or more metrics generated by each of plurality of host devices 550, 551 on which the application 502 is deployed and to cause the real-time probe agent 720 to report information about the one or more metrics to the data manager 570. In each embodiment, the reported information may include raw data, summary data, and sampling data as required by the policy 560.

The analytics engine 580 may be programmed to receive the information about the one or more metrics from each of the host devices 550, 551 and to determine if conditions of a rule for the one or more metrics are met. The analytics engine 580 may be further programmed to report information about whether the conditions of the rule are met to a client interface 590 that is communicatively coupled to the analytics engine. In addition or alternatively, the analytics engine 580 may be further programmed to report information about whether the conditions of the rule are met to a notification service 610 communicatively coupled to the analytics engine or the policy engine 555.

In another embodiment, the policy 560 includes instructions to cause the real-time probe agent 720 in each of the host devices 550, 551 to monitor one or more metrics generated by each of the host devices 550, 551 on which the application 502 is deployed, to cause the real-time probe agent 520 to analyze the one or more metrics to determine if conditions of a rule for the one or more metrics are met, and to cause the real-time probe agent 720 to report information about whether the conditions of the rule are met to the data manager 570.

The analytics engine 580 may be programmed to receive the information about whether the conditions of the rule are met from each of the host devices 550, 551 and to determine if conditions of a second rule for the one or more metrics are met. The analytics engine 580 may be programmed to report information about whether the conditions of the second rule are met to the client interface 590, a notification service 610, or the policy engine 555.

Figure 10:
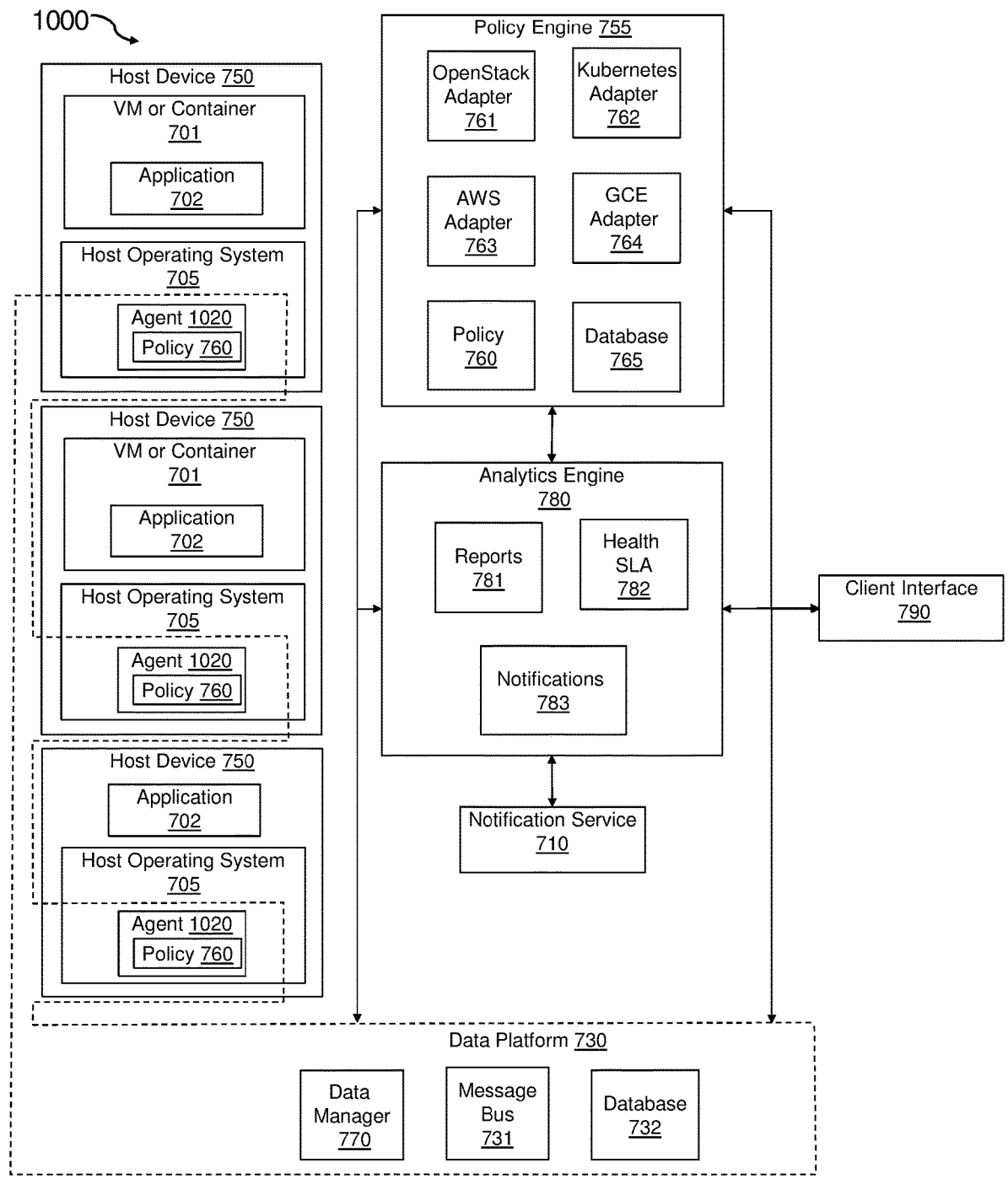
FIG. 10 illustrates another embodiment of a system of the present invention for real-time cloud infrastructure policy implementation and management.

FIG. 10 illustrates another embodiment of a system 1000 of the present invention. As shown, the system 1000 includes one or more host devices 750 running a host operating system 705. The host operating system 705 may be unique to each of the host devices 750 but for simplicity is shown only as 705. The host devices 750 represent devices with various types of virtualization including VMs and containers 701 and host devices without virtualization. The system 1000 also includes a real-time probe agent 1020 operating on each of the host devices 750. Each of the VMs or containers 701 or non-virtualized host devices may be running multiple applications (not shown). Included in those applications, each of the VMs or containers 701 or non-virtualized host devices may be running a specific application 702.

The system 1000 includes a policy engine 755 communicatively coupled to the host devices 750. The policy engine 755 contains a policy 760 associated with the specific application 702. The policy engine 755 is programmed to determine on which of the host devices 750 the specific application 702 is deployed as well as to monitor changes in deployment of the application 702 across the host devices 750 and to push the policy 760 to the real-time probe agent 1020 on each of the host devices 750 on which the application is deployed. The policy engine 755 is also programmed to retract the policy 760 if it determines that a host device is no longer running the specific application 702 associated with the policy 760.

In one example, one or more of the host devices 750 provide full virtualization virtual machines and the policy engine 755 comprises a virtual machine adapter 761 to monitor the changes in the deployment of the application 702 across the virtual machines 701 in the host devices 750. As illustrated in FIG. 10, the virtual machine adapter 761 may be an OpenStack adapter configured to communicate with an OpenStack cloud operating system operating on the host devices 750.

In another example, one or more of the host devices 750 provide operating system level virtualization and the policy engine 755 comprises a container adapter 762 to monitor the changes in the deployment of the application 702 across the containers 701 in the host devices 750. As illustrated in FIG. 10, the container adapter 762 may be a Kubernetes adapter configured to communicate with a Kubernetes platform on the host devices 750. In other embodiments, the policy engine 755 includes other adapters including cloud service provider adapters such as an Amazon Web Services (AWS) adapter and a Google Compute Engine (GCE) adapter. The adapters enable the policy engine 755 to learn and map the infrastructure utilized by the host devices 750 for the application 702 from the virtualization management software (e.g., OpenStack or Kubernetes). In some embodiments, the system 1000 contains virtual machine adapters, container adapters, and other adapters (e.g., Amazon Web Services (AWS), Google Compute Engine (GCE) adapter) and the systems 1000 may use all of the adapters simultaneously according to the types of host devices 750 in the system 1000.

As the infrastructure changes, the system 1000 keeps the mapping true and automatically adapts to changes in the location of the application 702 including changes due to usage growth, usage reduction, transitions between hosts, and crashes. The policy engine 755 may also include a database 765 such as a NoSQL database.

The system 700 may include a data platform section 730 that includes the real-time probe agents 1020 and the data manager 770. In some embodiments, the policy 760 includes instructions to cause the real-time probe agents 1020 in each of the host devices 750 to monitor one or more metrics generated by each of plurality of host devices 750 on which the application 702 is deployed and to cause the real-time probe agent 1020 to report information about the one or more metrics to the data manager 770. The distributed data platform section 730 includes a message bus 731 used to communicate information received from the real-time probe agent 1020 (including metrics and alarms) to the policy engine 755, the analytics engine 780, and/or the client interface 790. The data platform section 730 may also include a database 732 such as a NoSQL database.

To transfer information to the policy engine 755, the analytics engine 780, and/or the client interface 790, the data manager 770 may cause the information to be placed on the message bus 731 and then communicate to the policy engine 755, the analytics engine 780, and/or the client interface 790 that the information is available for retrieval on the message bus 731. The analytics engine 780 is communicatively coupled to the host devices 750, the data platform 730, and the policy engine 755. The analytics engine 780 may aggregate data from a plurality of the host devices 750 to determine if an applicable rule is met. Accordingly, the system 700 can run a second order analysis of all signals from all hosts 750 to capture the broader picture across all hosts. The analytics engine 780 may include a reports module 781 and a health SLA module 782 to enable capacity planning a health monitoring for the servers.

Figure 11:
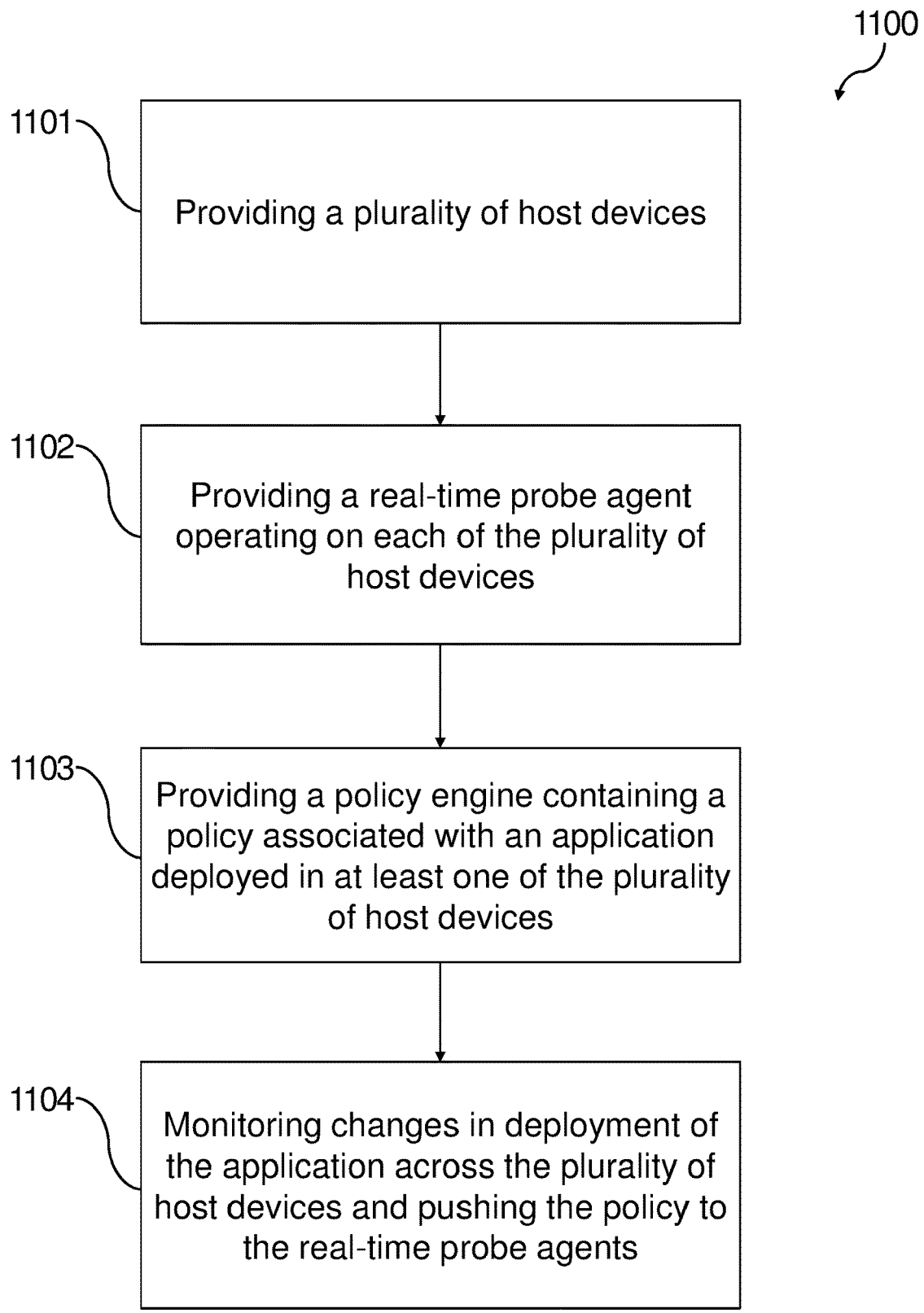
FIG. 11 presents an example of a method for providing real-time cloud infrastructure policy implementation and management in accordance with one or more embodiments of the disclosure.

FIG. 11 illustrates an exemplary method 1100 of the present invention. The method 1100 includes providing a plurality of host devices 1101, providing a real-time probe agent operating on each of the plurality of host devices 1102, and providing a policy engine communicatively coupled to the plurality of host devices and containing a policy associated with an application deployed in at least one of the plurality of host devices 1103. The method 1100 further includes monitoring with the policy engine changes in deployment of the application across the plurality of host devices and pushing with the policy engine the policy to the real-time probe agent on each of the plurality of host devices on which the application is deployed 1104.

Figure 12:
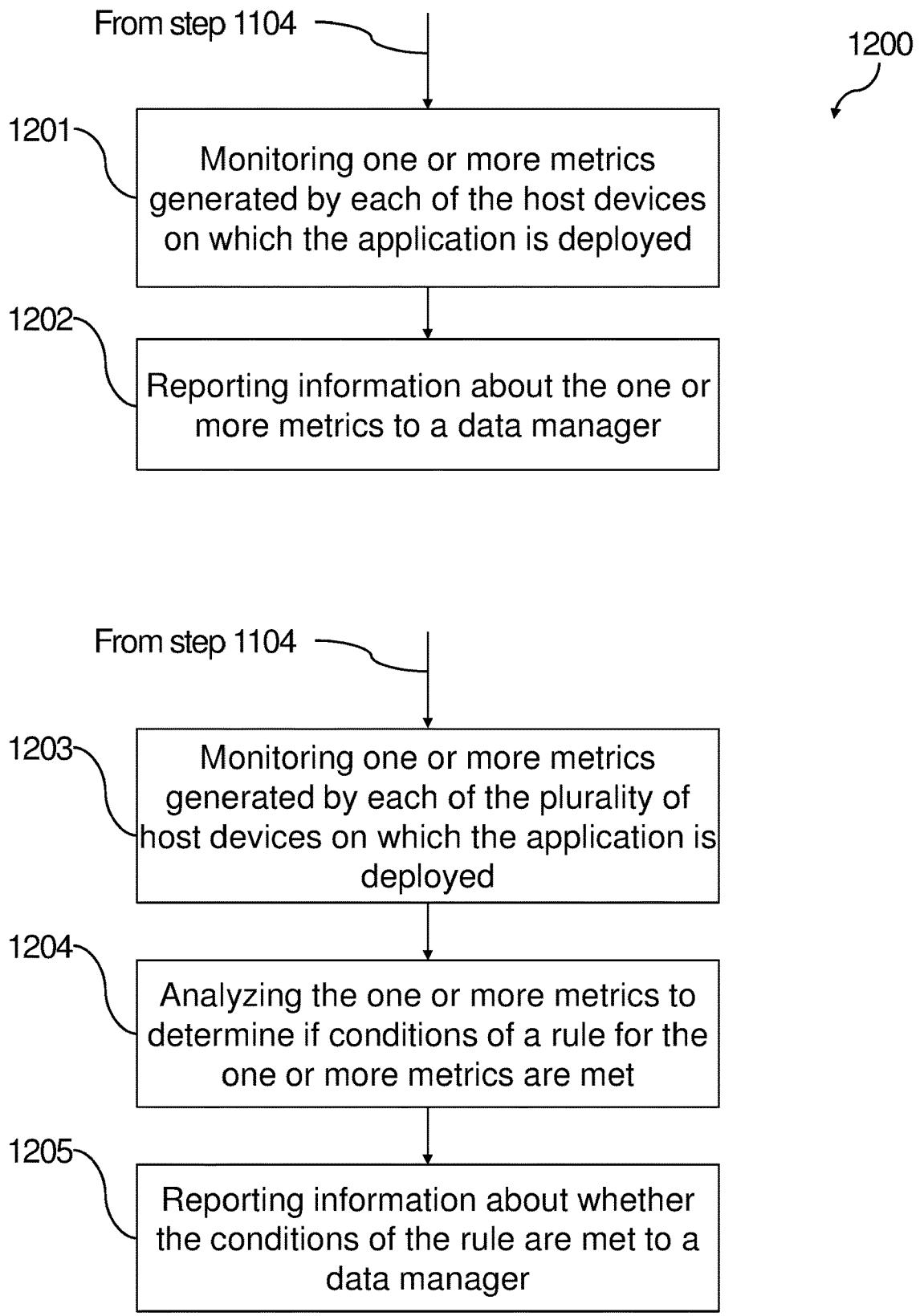
FIG. 12 presents another example of a method for providing real-time cloud infrastructure policy implementation and management in accordance with one or more embodiments of the disclosure.

FIG. 12 illustrates further exemplary methods 1200 of the present invention. The steps of FIG. 12 begin after the completion of the steps of FIG. 11. The method includes monitoring with the real-time probe agent in each of the plurality of host devices one or more metrics generated by each of the plurality of host devices on which the application is deployed 1201 and reporting with the real-time probe agent information about the one or more metrics to a data manager communicatively coupled to the plurality of host devices 1202.

Alternatively, the method 1200 may include monitoring with the real-time probe agent in each of the plurality of host devices one or more metrics generated by each of the plurality of host devices on which the application is deployed 1203, analyzing with the real-time probe agent the one or more metrics to determine if conditions of a rule for the one or more metrics are met 1204, and reporting with the real-time probe agent information about whether the conditions of the rule are met to a data manager communicatively coupled to the plurality of host devices 1205.

Figure 13:
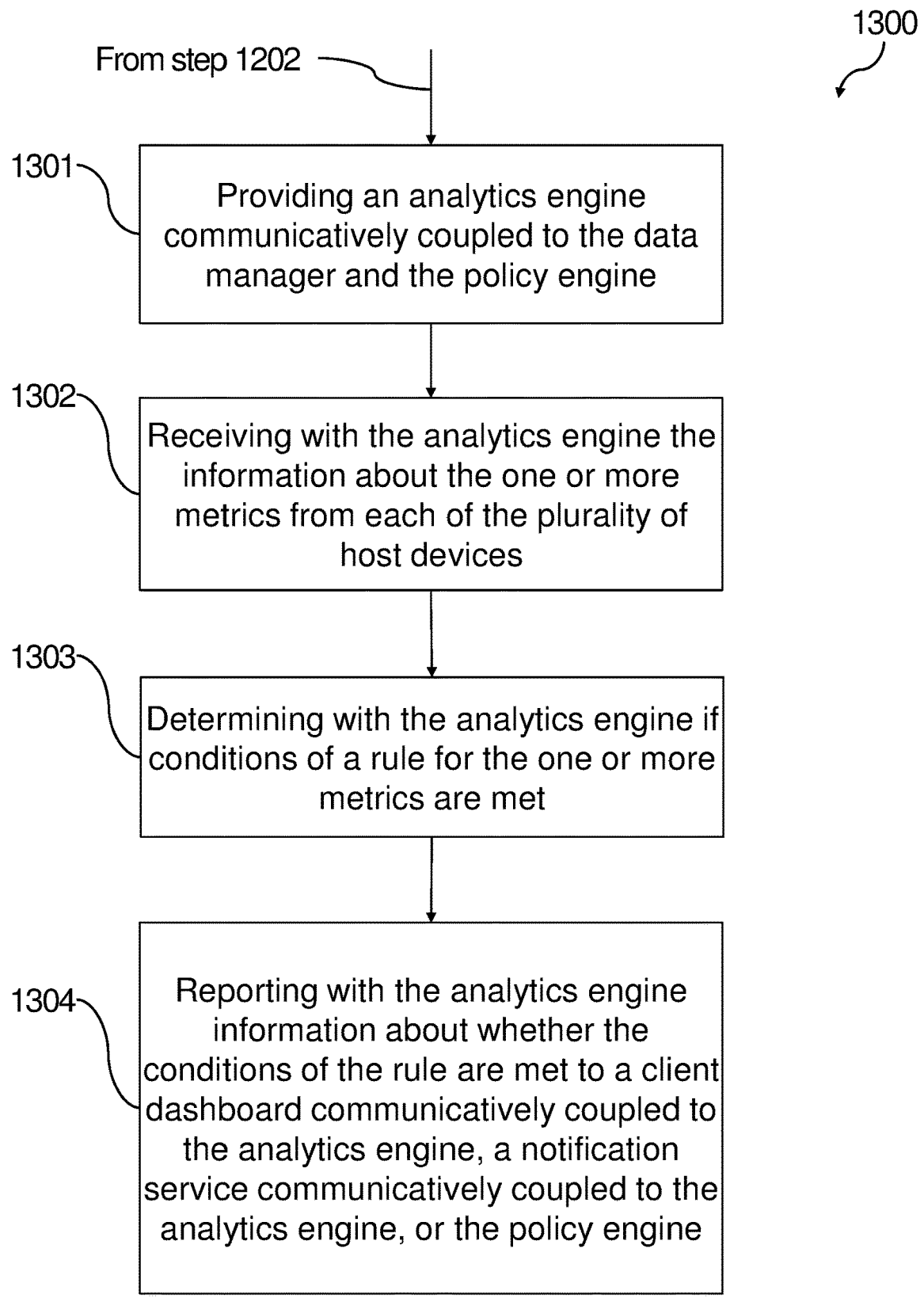
FIG. 13 presents another example of a method for providing real-time cloud infrastructure policy implementation and management in accordance with one or more embodiments of the disclosure.

FIG. 13 illustrates additional steps that a method 1300 of the present invention may include. The steps illustrated in FIG. 13 begin after steps 1202 in FIG. 12. The method 1300 may include providing an analytics engine communicatively coupled to the data manager and the policy engine 1301, receiving with the analytics engine the information about the one or more metrics from each of the plurality of host devices 1302, determining with the analytics engine if conditions of a rule for the one or more metrics are met 1303, and reporting with the analytics engine information about whether the conditions of the rule are met to a client dashboard communicatively coupled to the analytics engine, a notification service communicatively coupled to the analytics engine, or the policy engine 1304.

Figure 14:
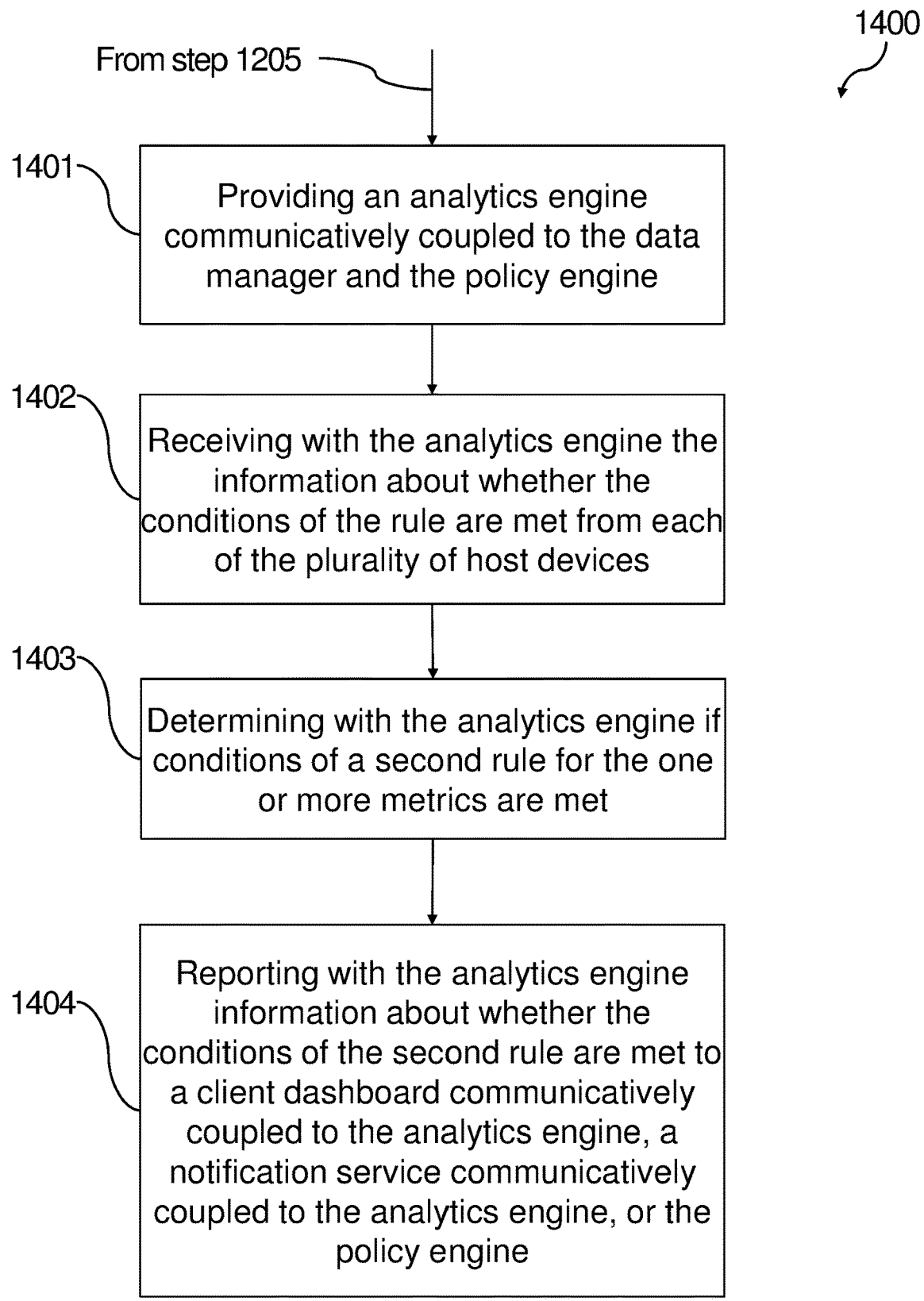
FIG. 14 presents another example of a method for providing real-time cloud infrastructure policy implementation and management in accordance with one or more embodiments of the disclosure.

FIG. 14 illustrates additional steps that a method 1400 of the present invention may include. The steps illustrated in FIG. 14 begin after steps 1205 in FIG. 12. The method 1400 may include providing an analytics engine communicatively coupled to the data manager and the policy engine 1401, receiving with the analytics engine the information about whether the conditions of the rule are met from each of the plurality of host devices 1402, determining with the analytics engine if conditions of a second rule for the one or more metrics are met 1403, and reporting with the analytics engine information about whether the conditions of the second rule are met to a client dashboard communicatively coupled to the analytics engine, a notification service communicatively coupled to the analytics engine, or the policy engine 1404.

The systems and methods of the present invention may also include a TCP accelerator (or vTCP) as disclosed in related U.S. patent application Ser. No. 14/149,621, entitled "SYSTEM AND METHOD FOR IMPROVING TCP PERFORMANCE IN VIRTUALIZED ENVIRONMENTS," filed on Jan. 7, 2014, and U.S. patent application Ser. No. 14/290,509, entitled "SYSTEM AND METHOD FOR IMPROVING TCP PERFORMANCE IN VIRTUALIZED ENVIRONMENTS," filed on May 29, 2014. The vTCP (1) makes available metrics that are not otherwise available and (2) lets allows modification the TCP parameters in real-time. That is, the vTCP enables novel monitoring and novel control of the TCP parameters according to the appropriate policy. The monitoring and control parameters include:

The TCP ingress connection open rate
The TCP ingress connection close rate
The TCP ingress connection abort rate
The TCP ingress connection refuse rate
The TCP ingress connection establish rate
The TCP egress connection open rate
The TCP egress connection close rate
The TCP egress connection abort rate
The TCP egress connection refuse rate
The TCP egress connection establish rate
The TCP ingress packet rate
The TCP egress packet rate
The TCP ingress bit rate
The TCP egress bit rate
The UDP ingress packet rate
The UDP egress packet rate
The UDP ingress bit rate
The UDP egress bit rate
The other ingress packet rate
The other egress packet rate
The other ingress bit rate
The other egress bit rate
The TCP egress DUPACK threshold count
The TCP egress window less than mss count
The TCP ingress DUPACK threshold count
The TCP ingress window less than mss count
The TCP ingress packet retransmission rate
The TCP egress packet retransmission rate
The TCP ingress packet reorder rate
The TCP egress packet reorder rate
The UDP flow rate
The TCP flow rate The monitoring and control application-level parameters include:

Application ingress response time
Application egress response time
Application ingress bit rate
Application egress bit rate
Application ingress packet rate
Application egress packet rate
Application http ingress response rate
Application http ingress request rate
Application http egress response rate
Application http egress request rate
Application http ingress error rate
Application http egress error rate
Application ingress rtt
Application egress rtt
Application rtt
Application flow duration
Application flow size As described in greater detail in related application U.S. patent application Ser. No. 14/811,957, entitled "ASSESSMENT OF OPERATIONAL STATES OF A COMPUTING ENVIRONMENT," filed on Jul. 29, 2015, embodiments of the disclosure can permit or otherwise facilitate monitoring locally at a host device a diverse group of performance metrics associated with the host device according to the appropriate policy. In addition, information generated from the monitoring can be analyzed locally at the host device in order to determine (at the host device) an operational state of a host device. In view of the localized nature of the monitoring and analysis of this disclosure, the assessment of operational conditions of the host device can be performed in real-time or nearly real-time. In addition, such an assessment can permit or otherwise facilitate detecting events and/or transitions between alarm conditions without the latency commonly present in conventional monitoring systems. The assessment in accordance with this disclosure can be based on rich, yet flexible, test condition that can be applied to information indicative of performance metrics. In certain implementations, the test condition can be applied to a defined computing component, e.g., a host device, an application executing in the host device, a virtual machine instantiated in the host device, or a container instantiated in the host device or in a virtual machine. Thus, embodiments of the disclosure can permit monitoring resource utilization attributed to each of the virtual machines or containers that shares resources of a host device. As such, a stream of real-time or nearly real-time metrics of resource consumption ordered by the computing component can be analyzed. Such specificity in the testing associated with assessment of operational states of a host device can permit or otherwise facilitate the detection of performance bottlenecks and/or determination of root-cause(s) of the bottleneck.

Implementation of aspects of this disclosure can provide, in at least certain embodiments, improvements over conventional technologies for monitoring operational conditions of a computing device (e.g., a host device, such as a server device) in a computing environment. In one example, assessment of an operational condition of the computing device is implemented locally at the computing device. Therefore, performance metrics associated with the assessment can be accessed at a higher frequency, which can permit or otherwise facilitate performing the assessment faster. Implementing the assessment locally avoids the transmission of information indicative of performance metrics associated with assessment to a remote computing device for analysis. As such, latency related to the transmission of such information can be mitigated or avoided entirely, which can result in substantial performance improvement in scenarios in which the number of performance metrics included in the assessment increases. In another example, the amount of information that is sent from the computing device can be significantly reduced in view that information indicative or otherwise representative of alarms and/or occurrence of an event is to be sent, as opposed to raw data obtained during the assessment of operational conditions. In yet another example, the time it takes to generate the alarm can be reduced in view of efficiency gains related to latency mitigation.

The policies of the present invention may include input information indicative or otherwise representative of a selection of performance metrics to be analyzed at the one or more host devices. The input information also can be indicative or otherwise representative of one or more rules associated with a test that can be utilized to perform or otherwise facilitate the analysis at the host device. The test can be associated with the selection of performance metrics in that the test can be applied to at least one of the performance metrics. The input information can be received from an end-user or from a computing device operationally coupled to the data manager.

In some embodiments, the host device(s) can embody or can constitute a server farm. For instance, the host device(s) can embody a cluster of 10 server devices separated in two groups. One or more of the host devices can be configured to execute an application, a virtual machine, and/or a containerized application (or a container). As such, the performance metrics that can be conveyed according to the policy include one or more of the following: (a) performance metrics associated with computing component (e.g., a host device, an instance of a virtual machine executing in the host device, an instance of a container executing in the host device, or the like), such as one or more of hard disk drive (HDD) space usage (expressed in percentage or in absolute magnitude); input/output (I/O) rate; memory space usage (expressed as a percentage or in absolute magnitude); network incoming bandwidth available, network outgoing bandwidth available, number of incoming packets, number of outgoing packets, packet size distribution, number of incoming packets lost, number of outgoing packets lost; round trip time (RTT) of all flows for a Instance; flow duration for a Instance; number of TCP Sessions Requested (SYN); number of TCP Sessions Confirmed (SYN-ACK); number of TCP Sessions Rejected (RST); central processing unit (CPU) usage (expressed as a percentage or as usage time interval); or I/O wait time, which includes the time the CPU is waiting on I/O requests, (b) performance metrics associated with execution of an application at a host device, such as one or more of number of packets reordered; number of packets dropped or lost; response-time (e.g., time taken by the application to respond to a request); request rate (e.g., number of requests that the application receives); response rate (e.g., number of responses performed or otherwise facilitated by the application); latency (e.g., RTT of some or all flows or threads for the application); flow size (e.g., total number of bytes transferred); flow duration for the application (e.g., total time of a flow, or the like.

Further or in other embodiments, a rule associated with a test can specify one or more matching criteria that can be utilized to determine if a computing component (e.g., a host device, a virtual machine, a container, or the like) under assessment satisfies at least one condition for (a) generating information indicative of occurrence of an event or (b) generating an alarm or information related thereto (e.g., alarm is in active state or an alarm is in an inactive state). A matching criterion can include a non-empty set of parameters and/or a non-empty set of operators. At least one operator of the non-empty set of operators can operate on at least one of the non-empty set of parameters. In addition or in one implementation, the at least one operator can operate on information indicative of a performance metric associated with the computing component. In some embodiments, the non-empty set of operators can include a function having a domain that can include one or more of the parameters and/or other parameter(s) (such as time).

A parameter included in a matching criterion can be a specific number (e.g., an integer or real number) indicative or otherwise representative of a threshold. Application of a rule associated with a test can include a comparison between the threshold and information indicative of a performance metric. For example, for CPU usage (one of several performance metrics contemplated in this disclosure), a rule can specify application of a relational operator (e.g., "greater than," "less than," "equal to") to the CPU usage and a numeric threshold (e.g., a defined percentage): If Host CPU usage>50% then raise Alert.

In certain scenarios, rather than being a predetermined parameter, a threshold can be a result of application of a function to information indicative of a performance metric. The function can be a scalar operator of a non-empty set of operators of a matching criterion. As such, in some implementations, the threshold can adopt a value that is an output of a defined algorithm. In one example, the function can represent the baseline standard deviation σ (a real number) of N samples $\{x_1, x_2, x_3 \ldots x_N\}$ of input information indicative of a performance metric (e.g., CPU usage):

$$\sigma = \sqrt{\frac{1}{N} \sum_{i=1}^{N} (x_i - \mu)^2}$$

Here, $x_1$ is a real number, i=1, 2 ... N, N is a natural number that defines a sampling interval) and μ is the mean of first N samples of the performance metrics (e.g., CPU usage). Therefore, the value of σ that can be computed for a specific sampling of information conveying CPU usage can be utilized to define a threshold associated with a rule, for example: If Host CPU Usage>2σ then raise Alert.

It is noted that σ is one example presented for the sake of illustration and other functions and/or operators can be utilized to define certain thresholds. For example, Min({•}) and Max({•}) of a sampling can be utilized. In addition or in the alternative, one or more of the moments, or a function thereof, of a sampling can be utilized as a function to determine a threshold value. For instance, the average (or first non-centered moment) of a sampling can be utilized as a threshold. It is noted that one of the parameters included in a rule can determine interval duration (ΔTs, which can be expressed in seconds or other unit of time) for collection (or sampling) of information indicative of a performance metric (e.g., CPU usage or other metrics).

Two types of rules can be configured: singleton rule and compound rule. A singleton rule tracks a single performance metric and compares the performance metric to a matching criterion. Control information associated with an event or an alarm can be generated in response to outcome of such a comparison. Multiple singleton rules can be defined based on different performance metrics for a given resource (e.g., a host device, an instance of virtual machine, an instance of a container, an instance of an application in execution). In addition, multiple singleton rules can be implemented concurrently or nearly concurrently for different instances. As an illustration, an Instance level alert can be generated based at least on the outcome of the application of the singleton rules. For instance, four single rules can be defined for two different instances (e.g., Instance 1 and Instance 2):

Singleton rule 1: If Instance 1 CPU Usage>50% then raise Alert;

Singleton rule 2: If Instance 1 Outgoing Bandwidth>500 Mbps then raise Alert;

Singleton rule 3: If Instance 2 disk_space_free<10% then raise Alert; and

Singleton rule 4: If Instance 2 CPU Usage>75% then raise Alert.

Singleton rule 5: If Host CPU Usage>50% then raise Alert

It is noted that rule 1 and rule 5 above are very different rules, as one rule relates to CPU usage within an instance and the other within a host device. It is further noted that the logical complement of a single rule also is a single rule, and can be utilized as a test condition in accordance with this disclosure.

A compound rule is a collection of two or more singleton rules. An order of the singleton rule(s) also defines the compound rule. Control information associated with an event or an alarm can be generated in response to outcomes of the two or more rules and, optionally, an order in which the outcomes occur. More specifically, example compound rules can be formed from the following two singleton rules: (A) Singleton Rule 1: if Host CPU Usage>50%; and (B) Singleton Rule 2: if Memory Usage>75% Raise Alert. A first compound rule can be the following:

Compound Rule 1=Singleton Rule 1 and then Singleton Rule 2. Stated equivalently, the Compound Rule 1 can be: if Host CPU usage>50% and after that Host Memory Usage>75% then raise Alert.

A second compound rule can be the following:

Compound Rule 2=Singleton Rule 2 and then Singleton Rule 1. Stated equivalently, the Compound Rule can be: if Host Memory Usage>75% and after that Host CPU usage>50% then raise Alert.

Concurrency of the rules also can provide an order in which the singleton rule can be applied nearly simultaneously and can be determined to be satisfied independently. Therefore, a third compound rule can be the following:

Compound Rule 3=Singleton Rule 1 and concurrently Singleton Rule 2. Stated equivalently, the Compound Rule 3 can be: if Host CPU Usage>50% and concurrently Host Memory usage>75% then raise Alert.

Other example compound rules can be formed using singleton rules for different instances of virtual machines configured to execute in a host device: (I) Singleton Rule 1: If Instance 1 Disk Usage>80% then raise Alert; and (II) Singleton Rule 2: If Instance 2 Disk Usage>80% then raise Alert. Example compound rules can be the following:

Compound Rule 1=Singleton Rule 1 and concurrently Singleton Rule 2 raise Alert. State equivalently, Compound Rule 1 is: If Instance 1 Disk Usage>80% and concurrently if Instance 2 Disk Usage>80% then raise Alert.

Compound Rule 2=When (Host MEMORY>90%) AND (Instance 1 CPU>50%) then raise Alert.

Compound Rule 3=When (Instance 1 CPU Usage>50%) AND (Instance 2 CPU Usage>50%) then raise Alert.

It is noted that such Compound Rule 2 correlates across two different metrics while measuring one on a host device and the second within an Instance (e.g., an instantiated VM or an instantiated container).

While for illustration purposes in the foregoing rule examples described herein a single operator is applied to information indicative of a performance metric and a predetermined threshold is relied upon as a matching criterion, the disclosure is not so limited. In some embodiments, parameters and functions associated with a rule can permit applying rich tests to information indicative of a performance metric. As an example, a rule can include an aggregation function that can generate information indicative of a performance metric (e.g., HDD usage) over a sampling period. The sample period can be a configurable parameter includes in the rule. In addition, the rule can include a relational operator (e.g., "greater than," "less than," "equal to," or the like) that can compare output of the aggregation function over the sampling period to a threshold (predetermined or computed from sampled information). Based on an outcome of the comparison the rule can generate a cumulative value indicative of a number of outcomes that satisfy a condition defined by the relational operator. In addition, the rule can stipulate that event is deemed to have occurred or that an alarm is to be generated in response to the determined cumulative value satisfying a defined criterion. Specifically, in one example, the test can be specified as follows:

If the aggregation function of the information sampling aggregated over the sampling period satisfies the relational operator with respect to the aggregated data and a threshold, then the sampling interval is marked as satisfying an exception condition. In addition, when it ascertained that the number of marked sampling intervals in a predetermined number of intervals is greater than or equal to a second threshold, then control information can be updated (e.g., generated or modified). For example, in event mode, updating the information can include generating control information indicative of an event having occurred. In another example, in alert mode, updating the information can include generating control information indicative of an alarm condition being active. It is noted that in alert mode, in case the alarm condition is active prior to ascertaining that the number of marked sampling intervals in the predetermined number of intervals is greater than or equal to the second threshold, an update of control information can be bypassed.

In addition, in event mode and in a scenario in which ascertaining that the number of marked sampling intervals in the predetermined number of intervals is less than the second threshold, updating the control information can include generating control information indicative of an event not having occurred. In view that the assessment described herein can be performed continually or nearly continually, updating the control information can include generating information that the event has ceased to occur. In alert mode, ascertaining that the number of marked sampling intervals in the predetermined number of intervals is less than the second threshold, updating the control information can include generating control information indicative of an alarm condition being inactive.

In some implementations, as described herein, a test in accordance with aspects of this disclosure can specify a group of computing components associated with one or more of the host devices on which the test is to be implemented. Such a subset can be referred to as the scope of the test. A computing component can be embodied in or can include a host device, an application executing in the host device, a virtual machine executing in the host device, or a containerized application (or container) executing in the host device. Implementation of the test at a host device associated with a computing component specified in the scope of the test can permit or otherwise facilitate assessment of performance state of the computing component. Therefore, it is noted that the scope of the test can mitigate or avoid operational overhead at the host device associated with the computing component by focusing the implementation of the test on a pertinent computing component.

In the present description, for purposes of explanation, numerous specific details have been set forth in order to provide a thorough understanding of the disclosure. It may be evident, however, that the subject disclosure may be practiced without these specific details. In other instances, well-known structures and devices are shown in block diagram form in order to facilitate describing the subject disclosure.

As used in this disclosure, including the annexed drawings, the terms "component," "system," "platform," "environment," "unit," "interface," and the like are intended to refer to a computer-related entity or an entity related to an operational apparatus with one or more specific functionalities, wherein the entity can be either hardware, a combination of hardware and software, software, or software in execution. One or more of such entities are also referred to as "functional elements." As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include I/O components as well as associated processor, application, or Application Programming Interface (API) components. While the foregoing examples are directed to aspects of a component, the exemplified aspects or features also apply to a system, platform, interface, node, coder, decoder, and the like.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

The term "processor," as utilized in this disclosure, can refer to any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, terms such as "store," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. Moreover, a memory component can be removable or affixed to a functional element (e.g., device, server).

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various embodiments described herein can be implemented as a method, apparatus, or article of manufacture using standard programming and/or engineering techniques. In addition, various of the aspects disclosed herein also can be implemented by means of program modules or other types of computer program instructions stored in a memory device and executed by a processor, or other combination of hardware and software, or hardware and firmware. Such program modules or computer program instructions can be loaded onto a general purpose computer, a special purpose computer, or another type of programmable data processing apparatus to produce a machine, such that the instructions which execute on the computer or other programmable data processing apparatus create a means for implementing the functionality of disclosed herein.

The term "article of manufacture" as used herein is intended to encompass a computer program accessible from any computer-readable device, carrier, or media. For example, computer readable media can include but are not limited to magnetic storage devices (e.g., hard drive disk, floppy disk, magnetic strips . . . ), optical discs (e.g., compact disc (CD), digital versatile disc (DVD), Blu-ray disc (BD) . . . ), smart cards, and flash memory devices (e.g., card, stick, key drive . . . ).

What has been described above includes examples of systems and methods that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system for cloud infrastructure policy implementation and management comprising:
   a plurality of host devices, each executing a plurality of virtual computing instances;
   a plurality of probe agents associated with the plurality of host devices, wherein each of the plurality of probe agents executes on a respective one of the plurality of host devices;
   a policy engine communicatively coupled to the plurality of host devices and containing a policy associated with an application program deployed in at least one of the plurality of host devices;
   wherein the policy engine is programmed to monitor changes in deployment of the application program across the plurality of host devices and to push the policy to the probe agent executing on each host device on which the application program is deployed; and
   wherein at least one of the plurality of probe agents is configured to:
   monitor one or more metrics generated by a first host device of the plurality of host devices on which the application program is deployed, wherein monitoring the one or more metrics is performed across each of the virtual computing instances executing on the first host device,
   analyze the one or more metrics to determine if conditions of a rule for the one or more metrics are met, wherein the policy comprises instructions to cause the at least one of the probe agents to report information about whether the conditions of the rule are met to a data manager communicatively coupled to the first host device,
   take an action on the first host device to implement the policy in response to determining that conditions of the rule are met by instantiating a new virtual computing instance to accommodate increased demand, wherein to take the action on the first host device to implement the policy in response to determining that conditions of the rule are met, the at least one of the plurality of probe agents is further configured to update control information, and
   after taking the action, monitor the one or more metrics across each of the plurality of virtual computing instances and the new virtual computing instance.

2. The system of claim 1, wherein:
   one or more of the plurality of host devices provides full virtualization virtual machines;
   the policy engine comprises a virtual machine adapter programmed to monitor the changes in the deployment of the application program across a plurality of virtual machines in the plurality of host devices;
   one or more of the plurality of host devices provides operating system level virtualization;
   the policy engine comprises a container adapter to monitor the changes in the deployment of the application program across a plurality of containers in the plurality of host devices;
   one or more of the plurality of host devices provides a cloud service provider host; and the policy engine comprises a cloud service provider adapter to monitor the changes in the deployment of the application program in the cloud service provider hosts.

3. The system of claim 1, wherein:
   one or more of the plurality of host devices provides full virtualization virtual machines;
   one or more of the plurality of host devices provides operating system level virtualization; and
   one or more of the plurality of host devices provides a physical host.

4. The system of claim 1, wherein:
   one of the plurality of host devices provides full virtualization virtual machines;
   the policy engine comprises a virtual machine adapter programmed to monitor the changes in the deployment of the application program across a plurality of virtual machines in the plurality of host devices; and
   the virtual machine adapter is an OpenStack adapter configured to communicate with an OpenStack cloud operating system operating on the plurality of host devices.

5. The system of claim 1, wherein:
   one of the plurality of host devices provides operating system level virtualization;
   the policy engine comprises a container adapter to monitor the changes in the deployment of the application program across a plurality of containers in the plurality of host devices; and
   the container adapter is a Kubernetes adapter configured to communicate with a Kubernetes manager located on the plurality of host devices.

6. The system of claim 1, wherein to update control information, the at least one of the plurality of probe agents is further configured to:
   update control information indicative of occurrence of an alarm condition.

7. The system of claim 1, further comprising: an analytics engine communicatively coupled to the data manager and the policy engine and programmed to receive the information about the one or more metrics, to determine if conditions of the rule for the one or more metrics are met, and to report information about whether the conditions of the rule are met to a client interface communicatively coupled to the analytics engine, a notification service communicatively coupled to the analytics engine, or the policy engine.

8. The system of claim 1, further comprising: an analytics engine communicatively coupled to the data manager and the policy engine and programmed to receive the information about if the conditions of the rule are met, to determine if conditions of another rule for the one or more metrics are met, and to report information about whether the conditions of the another rule are met to a client interface communicatively coupled to the analytics engine, a notification service communicatively coupled to the analytics engine, or the policy engine.

9. A method for providing cloud infrastructure policy implementation and management comprising:
providing a plurality of host devices, each executing a plurality of virtual computing instances;
providing a plurality of probe agents associated with the plurality of host devices, wherein each of the plurality of probe agents executes on a respective one of the plurality of host devices; and
providing a policy engine communicatively coupled to the plurality of host devices and containing a policy associated with an application program deployed in at least one of the plurality of host devices;
monitoring with the policy engine changes in deployment of the application program across the plurality of host devices and to pushing with the policy engine the policy to the probe agent operating on each host device on which the application program is deployed; and
wherein at least one of the plurality of probe agents is configured to:
monitor one or more metrics generated by a first host device of the plurality of host devices on which the application program is deployed, wherein monitoring the one or more metrics is performed across each of the virtual computing instances executing on the first host device,
analyze the one or more metrics to determine if conditions of a rule for the one or more metrics are met, wherein the policy comprises instructions to cause the at least one of the plurality of probe agents to report information about whether the conditions of the rule are met to a data manager communicatively coupled to the first host device, and
take an action on the first host device to implement the policy on the host in response to determining that conditions of the rule are met by instantiating a new virtual computing instance to accommodate increased demand, wherein to take the action on the first host device to implement the policy in response to determining that conditions of the rule are met, the at least one of the plurality of probe agents is further configured to update control information, and
after taking the action, monitor the one or more metrics across each of the plurality of virtual computing instances and the new virtual computing instance.

10. The method of claim 9, wherein one or more of the plurality of host devices provides full virtualization virtual machines, one or more of the plurality of host devices provides operating system level virtualization, and one or more of the plurality of host devices provides a cloud service provider host, the method further comprising:
monitoring with a virtual machine adapter in the policy engine the changes in the deployment of the application program across a plurality of virtual machines in the plurality of host devices;
monitoring with a container adapter in the policy engine the changes in the deployment of the application program across a plurality of containers in the plurality of host devices; and monitoring with a cloud service provider adapter in the policy engine the changes in the deployment of the application program in the cloud service provider hosts.

11. The method of claim 9, wherein:
the plurality of host devices provide full virtualization virtual machines;
the policy engine comprises a virtual machine adapter and further comprising: monitoring with the virtual machine adapter the changes in the deployment of the application program across a plurality of virtual machines in the plurality of host devices; and
the virtual machine adapter is an OpenStack adapter configured to communicate with an OpenStack cloud operating system operating on the plurality of host devices.

12. The method of claim 9, wherein:
the plurality of host devices provide operating system level virtualization;
the policy engine comprises a container adapter and further comprising: monitoring with the container adapter the changes in the deployment of the application program across a plurality of containers in the plurality of host devices; and
the container adapter is a Kubernetes adapter configured to communicate with a Kubernetes manager located on the plurality of host devices.

13. The method of claim 9,
wherein the at least one of the plurality of probe agents is further configured to update control information indicative of occurrence of an alarm condition.

14. The method of claim 9, further comprising: providing an analytics engine communicatively coupled to the data manager and the policy engine and receiving with the analytics engine the information about the one or more metrics, determining with the analytics engine if conditions of the rule for the one or more metrics are met, and reporting with the analytics engine information about whether the conditions of the rule are met to a client interface communicatively coupled to the analytics engine, a notification service communicatively coupled to the analytics engine, or the policy engine.

15. The method of claim 9, further comprising: providing an analytics engine communicatively coupled to the data manager and the policy engine and receiving with the analytics engine the information about if the conditions of the rule are met, determining with the analytics engine if conditions of another rule for the one or more metrics are met, and reporting with the analytics engine information about whether the conditions of the another rule are met to a client interface communicatively coupled to the analytics engine, a notification service communicatively coupled to the analytics engine, or the policy engine.

16. A cloud infrastructure policy implementation and management system comprising:
a plurality of host devices, each executing a plurality of virtual computing instances;
a plurality of probe agents associated with the plurality of host devices, wherein each of the plurality of probe agents executes on a respective one of the plurality of host devices;
a policy engine communicatively coupled to the plurality of host devices and containing a policy associated with an application program deployed in at least one of the plurality of host devices;
a data manager communicatively coupled to the plurality of host devices; and an analytics engine communicatively coupled to the data manager and the policy engine;
wherein the policy engine is programmed to monitor changes in deployment of the application program across the plurality of host devices and to push the policy to the probe agent operating on each host device on which the application program is deployed;
wherein the policy comprises instructions to cause each of the plurality of probe agents to monitor one or more metrics generated by each of the plurality of host devices on which the application program is deployed and across each of the virtual computing instances executing on each of the plurality of host devices, to analyze the one or more metrics to determine if conditions of a rule for the one or more metrics are met, to instantiate a new virtual computing instance on the host to implement the policy in response to determining that conditions of the rule are met, to cause each of the plurality of probe agents to report information about whether the conditions of the rule are met to the data manager communicatively coupled to the plurality of host devices, to analyze the one or more metrics to determine if conditions of a second rule for the one or more metrics are met, and to cause the real-time probe agent to report information about whether the conditions of the second rule are met to the data manager and to monitor the one or more metrics across each of the plurality of virtual computing instances and the new virtual computing instance after instantiating the new virtual computing instance; and
wherein the analytics engine is programmed to receive the information about the one or more metrics from each of the plurality of host devices, to determine if conditions of a rule for the one or more metrics are met, and to report information about whether the conditions of the rule are met to a client interface communicatively coupled to the analytics engine, a notification service communicatively coupled to the analytics engine, or the policy engine.

17. A system for cloud infrastructure policy implementation and management comprising:
a plurality of virtualized host devices, each executing a plurality of virtual computing instances;
a plurality of probe agents associated with the plurality of host devices, wherein each of the plurality of probe agents executes on a respective one of the plurality of virtualized host devices; and
a policy engine communicatively coupled to the plurality of host devices and containing a policy associated with an application program deployed in at least one of the plurality of virtualized host devices;
wherein the policy engine is programmed to monitor changes in deployment of the application program across the plurality of virtualized host devices and to push the policy to the probe agent operating on each host device on which the application program is deployed; and
wherein at least one of the plurality of probe agents is configured to:
monitor one or more metrics generated by a first host device of the plurality of host devices on which the application program is deployed, wherein monitoring the one or more metrics is performed across each of the virtual computing instances executing on the first host device,
analyze the one or more metrics to determine if conditions of a rule for the one or more metrics are met by instantiating a new virtual computing instance to accommodate increased demand, wherein the policy comprises instructions to cause the at least one of the probe agents to report information about whether the conditions of the rule are met to a data manager communicatively coupled to the first host device, and
take an action on the first host device to implement the policy in response to determining that conditions of the rule are met, wherein taking the action includes instantiating a new virtual computing instance in response to increased demand, and wherein to take the action on the first host device to implement the policy in response to determining that conditions of the rule are met, the at least one of the plurality of probe agents is further configured to update control information, and
after taking the action, monitor the one or more metrics across each of the plurality of virtual computing instances and the new virtual computing instance.

* * * * *